United States Patent
Chen et al.

(10) Patent No.: US 8,065,244 B2
(45) Date of Patent: Nov. 22, 2011

(54) NEURAL-NETWORK BASED SURROGATE MODEL CONSTRUCTION METHODS AND APPLICATIONS THEREOF

(75) Inventors: Dingding Chen, Plano, TX (US); Allan Zhong, Plano, TX (US); Syed Hamid, Dallas, TX (US); Stanley Stephenson, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 923 days.

(21) Appl. No.: 12/048,045

(22) Filed: Mar. 13, 2008

(65) Prior Publication Data
US 2008/0228680 A1 Sep. 18, 2008

Related U.S. Application Data

(60) Provisional application No. 60/894,834, filed on Mar. 14, 2007.

(51) Int. Cl.
*G06E 1/00* (2006.01)
*G06E 3/00* (2006.01)
*G06F 15/18* (2006.01)
*G06G 7/00* (2006.01)
*G06N 3/02* (2006.01)

(52) U.S. Cl. ............... 706/15; 706/12; 706/13; 706/14; 706/16; 706/19

(58) Field of Classification Search .................. None
See application file for complete search history.

(56) References Cited

U.S. PATENT DOCUMENTS

| | | | |
|---|---|---|---|
| 3,802,259 A | 4/1974 | Echels | |
| 3,946,226 A | 3/1976 | Smith | |
| 3,975,157 A | 8/1976 | Smith | |
| 4,055,763 A | 10/1977 | Antkiw | |
| 4,122,339 A | 10/1978 | Smith | |
| 4,122,340 A | 10/1978 | Smith | |

(Continued)

FOREIGN PATENT DOCUMENTS

EP 0552073 3/1997

(Continued)

OTHER PUBLICATIONS

Chen et al., "Acceleration of Levenberg-Marquardt training of neural networks with variable decay rate", IEEE, 2003, pp. 1873-1878.*

(Continued)

*Primary Examiner* — Omar Fernandez Rivas
(74) *Attorney, Agent, or Firm* — Daniel J. Krueger

(57) ABSTRACT

Various neural-network based surrogate model construction methods are disclosed herein, along with various applications of such models. Designed for use when only a sparse amount of data is available (a "sparse data condition"), some embodiments of the disclosed systems and methods: create a pool of neural networks trained on a first portion of a sparse data set; generate for each of various multi-objective functions a set of neural network ensembles that minimize the multi-objective function; select a local ensemble from each set of ensembles based on data not included in said first portion of said sparse data set; and combine a subset of the local ensembles to form a global ensemble. This approach enables usage of larger candidate pools, multi-stage validation, and a comprehensive performance measure that provides more robust predictions in the voids of parameter space.

20 Claims, 10 Drawing Sheets

U.S. PATENT DOCUMENTS

| | | | |
|---|---|---|---|
| 4,239,965 | A | 12/1980 | Oliver |
| 4,293,933 | A | 10/1981 | Park |
| 4,297,575 | A | 10/1981 | Smith |
| 4,430,567 | A | 2/1984 | Oliver |
| 4,605,854 | A | 8/1986 | Smith |
| 4,617,825 | A | 10/1986 | Ruhovets |
| 4,645,926 | A | 2/1987 | Randall |
| 4,646,240 | A | 2/1987 | Serra |
| 4,656,354 | A | 4/1987 | Randall |
| 4,912,655 | A | 3/1990 | Wood |
| 4,926,488 | A | 5/1990 | Nadas |
| 5,067,164 | A | 11/1991 | Denker et al. |
| 5,112,126 | A | 5/1992 | Graebner |
| 5,189,415 | A | 2/1993 | Shimada |
| 5,245,696 | A * | 9/1993 | Stork et al. ............... 706/13 |
| 5,251,286 | A | 10/1993 | Wiener |
| 5,374,823 | A | 12/1994 | Odom |
| 5,444,619 | A * | 8/1995 | Hoskins et al. ............... 702/13 |
| 5,461,698 | A | 10/1995 | Schwanke et al. |
| 5,465,321 | A | 11/1995 | Smyth |
| 5,469,404 | A | 11/1995 | Barber |
| 5,475,509 | A | 12/1995 | Okamoto |
| 5,517,854 | A | 5/1996 | Plumb |
| 5,525,797 | A | 6/1996 | Moake |
| 5,608,215 | A | 3/1997 | Evans |
| 5,659,667 | A * | 8/1997 | Buescher et al. ............... 706/23 |
| 5,828,981 | A | 10/1998 | Callender |
| 5,848,379 | A | 12/1998 | Bishop |
| 5,862,513 | A | 1/1999 | Mezzatesta |
| 5,870,690 | A | 2/1999 | Frenkel |
| 5,875,284 | A | 2/1999 | Wattanabe |
| 5,900,627 | A | 5/1999 | Odom |
| 5,940,777 | A | 8/1999 | Keskes |
| 6,044,327 | A | 3/2000 | Goldman |
| 6,092,017 | A | 7/2000 | Ishida |
| 6,140,816 | A | 10/2000 | Herron |
| 6,150,655 | A | 11/2000 | Odom |
| 6,163,155 | A | 12/2000 | Bittar |
| 6,192,352 | B1 | 2/2001 | Alouani |
| 6,207,953 | B1 | 3/2001 | Wilson |
| 6,272,434 | B1 | 8/2001 | Wisler |
| 6,295,504 | B1 | 9/2001 | Ye |
| 6,317,730 | B1 | 11/2001 | Neuneier |
| 6,374,185 | B1 | 4/2002 | Taner et al. |
| 6,381,591 | B1 | 4/2002 | Hoffmann et al. |
| 6,411,903 | B2 | 6/2002 | Bush |
| 6,424,956 | B1 | 7/2002 | Werbos |
| 6,456,990 | B1 | 9/2002 | Hoffmann et al. |
| 6,466,893 | B1 | 10/2002 | Latwesen et al. |
| 6,477,469 | B2 | 11/2002 | Ye |
| 6,615,211 | B2 | 9/2003 | Beygelzimer et al. |
| 6,704,436 | B1 | 3/2004 | Anxionnaz |
| 6,760,716 | B1 | 7/2004 | Ganesamoorthi et al. |
| 6,789,620 | B2 | 9/2004 | Schultz |
| 6,911,824 | B2 | 6/2005 | Bittar |
| 7,019,528 | B2 | 3/2006 | Bittar |
| 7,043,463 | B2 | 5/2006 | Bonabeau et al. |
| 7,138,803 | B2 | 11/2006 | Bittar |
| 7,170,418 | B2 | 1/2007 | Rose-Pehrsson et al. |
| 7,243,056 | B2 * | 7/2007 | Olhofer et al. ............... 703/7 |
| 7,265,552 | B2 | 9/2007 | Bittar |
| 7,280,987 | B2 * | 10/2007 | Chen et al. ............... 706/15 |
| 7,308,134 | B2 | 12/2007 | Wersing et al. |
| 7,328,107 | B2 | 2/2008 | Strack et al. |
| 7,363,280 | B2 * | 4/2008 | Jin et al. ............... 706/13 |
| 7,363,281 | B2 | 4/2008 | Jin et al. |
| 7,565,833 | B2 | 7/2009 | Gillen et al. |
| 7,587,373 | B2 | 9/2009 | Smith et al. |
| 7,613,665 | B2 * | 11/2009 | Chen et al. ............... 706/16 |
| 2002/0147695 | A1 | 10/2002 | Khedkar et al. |
| 2002/0152030 | A1 | 10/2002 | Schultz |
| 2002/0165911 | A1 | 11/2002 | Gabber et al. |
| 2002/0170022 | A1 | 11/2002 | Shirai et al. |
| 2002/0177954 | A1 | 11/2002 | Vail |
| 2002/0178150 | A1 | 11/2002 | Hytopolos et al. |
| 2002/0183932 | A1 | 12/2002 | West et al. |
| 2002/0187469 | A1 | 12/2002 | Kolodner et al. |
| 2002/0188424 | A1 | 12/2002 | Grinstein et al. |
| 2003/0115164 | A1 | 6/2003 | Jeng et al. |
| 2004/0019427 | A1 | 1/2004 | San Martin |
| 2004/0117121 | A1 | 6/2004 | Gray et al. |
| 2004/0133531 | A1 | 7/2004 | Chen |
| 2004/0222019 | A1 | 11/2004 | Estes |
| 2004/0257240 | A1 | 12/2004 | Chen et al. |
| 2005/0114280 | A1 | 5/2005 | Rising, III |
| 2005/0246297 | A1 * | 11/2005 | Chen et al. ............... 706/15 |
| 2006/0195204 | A1 | 8/2006 | Bonabeau et al. |
| 2006/0256655 | A1 | 11/2006 | Sinha et al. |
| 2007/0011114 | A1 * | 1/2007 | Chen et al. ............... 706/15 |
| 2007/0011115 | A1 * | 1/2007 | Smith et al. ............... 706/15 |
| 2007/0019865 | A1 | 1/2007 | Owechko et al. |
| 2007/0167846 | A1 | 7/2007 | Sternickel et al. |
| 2007/0183670 | A1 | 8/2007 | Owechko et al. |
| 2007/0235225 | A1 | 10/2007 | Bittar |

FOREIGN PATENT DOCUMENTS

| | | |
|---|---|---|
| JP | 04089998 | 3/1992 |
| WO | 9964896 | 12/1999 |
| WO | WO-9964896 | 12/1999 |

OTHER PUBLICATIONS

Chen et al., "Neural network ensemble selection using multi-objective gentic algorthn in processing pulsed neutron data", SPWLA 45th annual logging sympossium, 2004, pp. 1-13.*

Chandra et al., "Ensemble learning using multi-objective evolutionary algorithms", Journal of mathematical modelling and algorithms, 2006, pp. 417-445.*

Chandra et al., "Ensemble learning using multi-objective evolutionary algorithms", Kluwer Academic Publishers, 2005, pp. 1-34.*

Brown, "Negative Correlation Learning and the Ambiguity Family of Ensemble Methods", Springer-Verlag Berlin, Heidelberg, MCS2003, LNCS 2709, (2003), pp. 266-275.

Chen, Dingding et al., "Neural Network Training-Data Selection Using Memory-Reduced Cluster Analysis for Field Model Development", SPE 80906; Society of Petroleum Engineers, SPE Production and Operation Symposium, Oklahoma City, OK, Mar. 23-25, 2003, 5 pages.

Everson, R.M. et al., "Full Elite-Sets for Multi-objective, Optimization", Fifth International Conference on Adaptive Computing in Design and Manufacture (ACDM 2002), 8 pages.

Fung, "Modular Artificial Neural Network for Prediction of Petrophysical Properties from Well Log Data", IEEE Instrumentation and Measurement Technology Conference, Brussels, Belgium, Jun. 1996, pp. 1010-1014.

Granitto, P. M., et al., "Modeling of Sonic Logs in Oil Wells with Neural Networks Ensembles", Argentine Symposium on Artificial Intelligence (ASA! '01), Bs. As., Sep. 12-13, 2001, 7 pages.

Hampson, Daniel P., et al., "Use of Multiattribute Transforms to Predict Log Properties from Seismic Data", Society of Exploration Geophysicists, Geophysics vol. 66. No. 1, Jan. 2001, pp. 220-236.

Helle, H., et al., "Fluid saturation from well logs using committee neural networks", Petroleum Geoscience, 2002, vol. 8, Also cited in PCT ISR Jul. 3, 2008, pp. 109-118.

Islam, M., et al., "A Constructive Algorithm for Training Cooperative Neural Network Ensembles", IEEE Transactions on Neural Networks, 2003, vol. 14, No. 4, 2003, pp. 820-834.

Krough, A., et al., "Neural Network Ensembles, Cross Validation, and Active Learning", Advances in Neural Information Processing Systems 7, Cambridge, MA, MIT Press, 1995, pp. 231-238.

Lespinats, et al., "DD-HDS: A Method for Visualization and Exploration of High-Dimensional Data", IEEE, Transactions on Neural Networks, vol. 18, No. 5, (Sep. 2007), pp. 1265-1279.

Liu, Y., "Evolutionary Ensembles with Negative Correlation Learning", IEEE Transactions on Evolutionary Computation, vol. 4, No. 4, Nov. 2000, pp. 380-387.

Liu, Y., et al., "Ensemble Learning via Negative Correlation", Neural Networks, vol. 12, Issue 10, Dec. 1999, pp. 1399-1404.

Opitz, D.W. et al., "A Genetic Algorithm Approach for Creating Neural-Network Ensembles", Combining Artificial Neural Nets, pp. 79-99, Springer-Verlag, London, 1999, http://citeseer.ist.psu.edu.optiz99genetic.html,(1999), 26 pages.

Zhou, Zhi-Hua, et al., "Genetic Algorithm based Selective Neural Network Ensemble", International Joint Conference on Artificial Intelligence, 2001, vol. 2, Seattle, WA, 2001, pp. 797-802.

S. Obayashi, et al., "Multiobjective evolutionary computation for supersonic wing-shape optimization," IEEE Transactions on Evolutionary Computation, vol. 4, No. 2, 2000, pp. 182-187.

S. Dutta, et al., "A hybrid ensemble model of Kriging and neural networks for ore grade estimation," International Journal of Surface Mining, Reclamation and Environment, vol. 20, No. 1, 2006, pp. 33-45.

J. M. Twomey and A. E. Smith, "Committee networks by resampling," in Intelligent Engineering Systems through Artificial Neural Networks, C. H. Dagli, M. Akay, C. L. P. Chen, B. R. Fernandez and J. Ghosh, Eds. ASME Press, 1995, vol. 5, pp. 153-158.

A. Krogh, et al., "Neural network ensembles, cross validation, and active learning," in Advances in Neural Information Processing System 7, Cambridge, MA: MIT Press, 1995, pp. 231-238.

G. Brown, et al., "Diversity creation methods: A survey and categorization," Journal of Information Fusion, vol. 6, No. 1, Jan. 2005, pp. 5-20.

G. P. Coelho and F. J. Von Zuben, "The influence of the pool of candidates on the performance of selection and combination techniques in ensembles," in Proc. of the International Joint Conference on Neural Networks, Vancouver, BC, Canada, 2006, pp. 10588-10595.

D. Chen, et al., "Neural network ensemble selection using a multi-objective genetic algorithm in processing pulsed neutron data," Petrophysics, vol. 46, No. 5, Oct. 2005, pp. 323-334.

D. Chen, et al., "Variable input neural network ensembles in generating synthetic well logs," Proc. of International Joint Conference on Neural Networks, Vancouver, BC, Canada, 2006, pp. 2273-2280.

Y. Jin, et al., "Neural network regularization and ensembling using multi-objective evolutionary algorithms," in Proc. Congress on Evolutionary Computation, Portland, Oregon, 2004, pp. 1-8.

H. Abbass, "Pareto neuro-evolution: Constructing ensemble of neural networks using multi-objective optimization," in Proc. Congress on Evolutionary Computation, Canberra, Australia, 2003, pp. 2074-2080.

A. Chandra and X. Yao, "Divace: Diverse and accurate ensemble learning algorithm," in The Fifth International Conference on Intelligent Data Engineering and Automated Learning, Exeter, UK, 2004, pp. 619-625.

P. Castillo, et al., "Multiobjective optimization of ensembles of multilayer perceptrons for pattern classification," in Parallel Problem Solving from Nature IX, Reykjavik, Iceland, 2006, pp. 453-462.

Y. Jin, et al., "A framework for evolutionary optimization with approximate fitness functions," IEEE Transactions on Evolutionary Computation, vol. 6, No. 5, 2002, pp. 481-494.

B. Yang, et al., "Managing approximation models in multiobjective optimization," in Structure and Multidisciplinary Optimization, vol. 24, No. 2, 2002, pp. 141-156.

R. Maclin and J. W. Shavlik, "Combining the predictions of multiple classifiers: using competitive learning to initialize neural networks," in Proc. of the 14th International Joint Conference on Artificial Intelligence, Montreal, Canada, 1995, pp. 524-530.

P. Sollich and A. Krogh, "Learning with ensembles: how over-fitting can be useful," in Advances in Neural Information Processing Systems 8, D. S. Touretzky, M. C. Mozer, and M. E. Hasselmo, Eds. Cambridge, MA: MIT Press, 1996, pp. 190-196.

Ong, "Evolutionary Optimization of Computationally Expensive Problems Via Surrogate Modeling", AIAA Journal, vol. 41, No. 4, Apr. 2003, pp. 1-10.

Renner, et al., "Combining Constructive Neural Networks for Ensemble Classification", AIM Proc. Fifth Joint Conference on Information Sciences, Feb. 2000, pp. 1-6.

Torres-Sospedra, "A Research on Combination Methods for Ensembles of Multilayer Feedforward", Porceedings of International Joint Conference on Neural Networks, Montreal, Canada, Jul. 31-Aug. 4, 2005, pp. 1-6.

Dahl, "Structured Programming", Academic Press, A.P.I.C. Studies in Data Processing, No. 8, 1972, pp. 7 and 19.

Anonymous, "Log Interpretation Charts", Dresser Atlas, Dresser Industries, Inc., USA, Jun. 1983, 2 pages.

Randall, "PDK-100 Log Examples in the Gulf Coast", 26th Annual SPWL Logging Symposium, Jun. 17-20, 1985, 6 pages.

Randall, "PDK-100 Enhances Interpretation Capabilities for Pulsed Neutron Capture Logs", 27th Annual SPWL Logging Symposium, Jun. 9-13, 1986, 6 pages.

Hansen, "Neural Network Ensembles", IEEE Transactions on Pattern Analysis and Machine Intelligence, vol. 12, No. 10, 1990, pp. 993-1001.

Odom, "A New 1.625 Diameter Pulsed Neutron Capture and Inelastic/Capture Spectral Combination System Provides Answers in Complex Reservoirs", SPWLA 35th Annual Logging Symposium, Jun. 1994, 19 pages.

Wilson, "Bulk Density Logging with High-Energy Gammas Produced by Fast Neutron Reactions with Formation Oxygen Atoms", IEEE Nuclear Science Symposium and Medical Imaging Conference Record, vol. 1, Oct. 21-28, 1995, 7 pages.

Odom, Program and Pertinent Slides—by Richard C. Odom, SIAM Symposium on Inverse Programs: Geophysical Applications, Dec. 17, 1995, 5 pages.

Schnieder, "Using Pulsed Neutron Decay-Spectrum Data and Inflatable Packer Plugdown Assemblies Improve Oil Production Rates in a Mature $CO_2$ Flood", SPE 35165, SPE Permian Basin Oil & Gas Recovery Conference, Midland, Texas, Mar. 27-29, 1996, pp. 167-176.

Fung, "Modular Artificial Neural Network for Prediction of Petrophysical Properties from Well Log Data", IEEE Instrumentation and Measurement Technology Conference, Brussels, Belgium, Jun. 4-6, 1996, pp. 1010-1014.

Streeter, "Cased Hole Exploration: Modern Pulsed Neutron Techniques for Locating By-Passed Hydrocarbons in Old Wells", SPE 35162, SPE Permian Basin Oil & Gas Recovery Conference, Midland, Texas, Mar. 27-29, 1996, pp. 167-176.

Odom, "Applications and Derivation of a New Cased-Hole Density Porosity in Shaly Sands", SPE 38699, SPE Annual Technical Conference and Exhibition, San Antonio, Texas, Oct. 5-8, 1997, pp. 475-487.

Opitz, "A Genetic Algorithm Approach for Creating Neural-Network Ensembles", Combining Artificial Neural Nets, http://citeseer.ist.psu.edu/opitz99genetic.html, 1999, Springer-Verlag, London, pp. 79-99.

Odom, "Shaly Sand Analysis Using Density-Neutron Porosities from a Cased-Hole Pulsed Neutron System", SPE 55641, SPE Rocky Mountain Regional Meeting, Gillette, Wyoming, May 15-18, 1999, 10 pages.

Odom, "A Pulsed Neutron Analysis Model for Carbon Dioxide Floods: Application to the Reinecke Field, West Texas", SPE 59717, SPE Permian Basin Oil & Gas Recovery Conference, Midland, Texas, Mar. 21-23, 2000, 4 pages.

Odom, "Examples of Cased Reservoir Analysis in the Venturn Basin, California", SPE 62850 SPE/AAPG Western Regional Meeting, Long Beach, California, Jun. 19-23, 2000, 7 pages.

Odom, "Assessing the Capabilities of a Cased-Hole Reservoir Analysis System in the Gulf of Thailand", SPE 64404, SPE Asia Pacific Oil and Gas Conference and Exhibition, Brisbane, Australia, Oct. 16-18, 2000, 10 pages.

Liu, "Evolutionary Ensembles with Negative Correlation Learning", IEEE Transactions on Evolutionary Computation, vol. 4, No. 4, Nov. 2000, pp. 380-387.

Odom, "Log Examples with a Prototype Three-Detector Pulsed-Neutron System for Measurement of Cased-Hole Neutron and Density Porosities", SPE 71042, SPE Rocky Mountain Petroleum Technology Conference, Keystone, Colorado, May 21-23, 2001, 10 pages.

Odom, "Improvements in a Through-Casing Pulsed-Neutron Density Log", PSE 71742, SPE Annual Technical Conference and Exhibition, New Orleans, Louisiana, Sep. 30-Oct. 3, 2001, 9 pages.

Zhou, "Genetic Algorithm Based Selective Neural Network Ensemble", 17th International Joint Conference on Artificial Intelligence, vol. 2, Seattle, WA, 2001, pp. 797-802.

Hampson, "Use of Multiattribute Transforms to Predict Log Properties from Seismic Data", Society of Exploration Geophysicists, Geophysics vol. 66. No. 1, Jan.-Feb. 2001, pp. 220-236.

Granitto, "Modeling of Sonic Logs in Oil Wells with Neural Network Ensembles", Argentine Symposium on Artificial Intelligence (ASAI'01), http://citeseer.ist.psu.edu/granitto01/modeling.html, Sep. 12-13, 2001, 7 pgs.

Mullen, "The Applications of Neural Networks to Improve the Usability of Pulsed Neutron Logs for Evaluating Infill Well Locations in the Piceance Basin of Western Colorado and the San Juan Basin of Northwest New Mexico", SPE Rocky Mountain Petroleum Technology Conference, Keystone, Colorado, 2001, pp. 1-14.

Everson, "Full Elite-Sets for Multi-Objective Optimization", Fifth International Conference on Adaptive Computing in Design and Manufacture (ACDM 2002), http://www.dcs.ex.ac.uk/academics/reverson/pubs/adcomp-abs.html, (download Jun. 14, 2004), 8 pages.

Helle, "Fluid Saturation from Sell Logs Using Committee Neural Networks", Petroleum Geoscience, 2002, vol. 8, pp. 109-118.

Gaspar-Cunha, "RPSGAe—Reduced Pareto Set Genetic Algorithm with Elitism", Workshop on Multiple Objective Metaheuristics, Paris, France, Nov. 2002, 6 pages.

Flowjo, "Clustering—Clustering Algorithm Parameters", FlowJo Reference Manual, FlowJo Version 4, www.flowjo.com/v4/html/clusterparams.html, Dec. 30, 2002 (download), pp. 1-5.

Flowjo, "Clustering—A New, Highly Efficient Algorithm for Cluster Analysis", FlowJo Reference Manual, FlowJo Version 4, www.flowjo.com/v4/html/cluster.html, Dec. 30, 2002 (download), pp. 1-3.

Flowjo, "Clustering—Play-by-Play of Clustering Process", FlowJo Reference Manual, FlowJo Version 4, www.flowjo.com/v4/html/clusterprocess.html, Dec. 30, 2002 (download), pp. 1-2.

Quirein, "An Assessment of Neural Networks Applied to Pulsed Neutron Data for Predicting Open Hole Triple Combo Data", 2003, 14 pages.

Chakraborti, N et al., "A Study of the Cu Clusters Using Gray-Coded Genetic Algorithms and Differential Evolution", Journal of Phase Equilibria and Diffusion, vol. 25, No. 1, (Apr. 2007), pp. 16-21.

Chen, Dingding "Variable Input Neural Network Ensembles in Generating Synthetic Well Logs", International Joint Conference on Neural Networks, Vancouver, BC, Canada, (2006), pp. 2273-2280.

Chen, Dingding et al., "Neural Network Ensemble Selection Using Multi-Objective Genetic Algorithm in Processing Pulsed Neuron Data", Petrophysics, vol. 46, No. 5, (Jun. 6-9, 2004), 13 pgs.

Chen, Dingding et al., "Neural-Network Based Surrogate Model Construction Methods and Applications Thereof", U.S. Appl. No. 12/048,045, filed Mar. 13, 2008, 30 pgs.

Chen, Dingding et al., "Systems and Methods Employing Cooperative Optimization-Based Dimensionality Reduction", U.S. Appl. No. 12/190,418, filed Aug. 6, 2008, 32 pgs.

Coelho, Guilherme P., et al., "The Influence of the Pool of Candidates on the Performance of Selection and Combination Techniques in Ensembles", International Joint Conference on Neural Networks, Vancouver, BC, Canada, (2006), pp. 10588-10595.

Dahl, O. J., et al., "Structured Programming", A.P.I.C. Studies in Data Processing, No. 8, Academic Press London and New York, (1972), 6 pgs.

Eberhart, Russell et al., "A New Optimizer Using Particle Swarm Theory", Micro Machine and Human Science, (Oct. 1995), pp. 39-43.

Hamza, Karim et al., "Vehicle Crashworthiness Design via a Surrogate Model Ensemble and a Co-Evolutionary Genetic Algorithm", Proceedings of IDETC/CIE 2005, ASME International Design Engineering Technical Conferences & Computers and Information in Engineering Conference, Long Beach, California, (Sep. 24, 2005), 9 pgs.

International Preliminary Report on Patentability, dated Mar. 12, 2009, Appl No. PCT/US2005/009494, Genetic Algorithm Based Selection of Neural Network Ensemble for Processing Well Logging Data, filed Mar. 22, 2005, 6 pgs.

International Preliminary Report on Patentability, dated Feb. 17, 2011, Appl No. PCT/US09/52860, Systems and Methods Employing Cooperative Optimization Based Dimensionality Reduction, filed Aug. 5, 2009, 8 pgs.

International Preliminary Report on Patentability, dated Sep. 15, 2009, Appl No. PCT/US08/56894, "Neural-Network Based Surrogate Model Construction Methods and Applications Thereof", filed Mar. 13, 2008, 1 pg.

Internatonal Search Report and Written Opinion, dated Sep. 28, 2009, Appl No. PCT/US09/52860, Systems and Methods Employing Cooperative Optimization Based Dimensionality Reduction, filed Aug. 5, 2009, 13 pgs.

Islam, Monirul et al., "A Constructive Algorithm for Training Cooperative Neural Network Ensembles", IEEE Transactions on Neural Networks, vol. 14, No. 4, (Jul. 2003), pp. 820-834.

Liu, Y. et al., "Ensemble learning via negative correlation", Neural Networks, vol. 12, Issue 10, www.elsevier.com/locate/neunet, (Dec. 1999), pp. 1399-1404.

PCT International Preliminary Report on Patentability, dated May 22, 2009, Appl No. PCT/US/2006/02118, "Ensembles of Neural Networks with Different Input Sets", filed Jan. 6, 2006, 11 pgs.

PCT International Search Report and Written Opinion, dated Mar. 20, 2008, Appl No. PCT/US05/09494, "Genetic Algorithm Based Selection of Neural Network Ensemble for Processing Well Logging Data", filed Mar. 22, 2006, 11 pgs.

PCT International Search Report and Written Opinion, dated Mar. 21, 2007, Appl No. PCT/US006/25029, "Well Logging with Reduced Usage of Radiosotopic Sources", filed Jun. 26, 2006, 8 pgs.

PCT International Search Report and Written Opinion, dated Jul. 3, 2008, Appl No. PCT/US06/21158, "Ensembles of Neural Networks with Different Input Sets", filed Jun. 1, 2006, 11 pgs.

PCT International Search Report and Written Opinion, dated Dec. 3, 2004, Appl No. PCT/US03/41239, "Neural Network Training Data Selection Using Memory Reduced Cluster Analysis for Field Model Development", filed Dec. 23, 2003, 6 pgs.

PCT Written Opinion, dated Aug. 6, 2009, Appl No. PCT/US08/56894, "Neural-Network Based Surrogate Model Construction Methods and Applications Thereof", filed Mar. 13, 2008, 5 pgs.

Singapore Written Opinion, dated Jan. 11, 2010, Appl No. 200905991-6, "Neural-Network Based Surrogate Model Construction Methods and Applications Thereof", filed Mar. 13, 2008, 7 pgs.

Tittman, J. et al., "The Physical Foundations of Formation Density Logging (Gamma Gamma)", Geophysics, vol. XXX, No. 2, (Apr. 1965),pp. 284-293.

U.S. Non-Final Office Action, dated May 20, 2011, U.S. Appl. No. 12/190,418, "Systems and Methods Employing Cooperative Optimization-Based Dimensionality Reduction," filed Aug. 12, 2008, 37 pgs.

US Advisory Action, dated Jun. 18, 2008, U.S. Appl. No. 10/393,641,"Neural Network Training Data Selection Using Memory Reduced Cluster Analysis for Field Model Development", filed Jun. 8, 2006, 4 pgs.

US Advisory Action, dated Oct. 17, 2006, U.S. Appl. No. 10/393,641, "Neural Network Training Data Selection Using Memory Reduced Cluster Analysis for Field Model Development", filed Jun. 8, 2006, 3 pgs.

US Final Office Action, dated May 7, 2007, U.S. Appl. No. 10/811,403, "Genetic Algorithm Based Selection of Neural Network Ensemble for Processing Well Logging Data", filed Mar. 26, 2004, 7 pgs.

US Final Office Action, dated Jun. 8, 2006, U.S. Appl. No. 10/393,641, "Neural Network Training Data Selection Using Memory Reduced Cluster Analysis for Field Model Development", filed Mar. 21, 2003, 73 pgs.

US Final Office Action, dated Nov. 24, 2008, U.S. Appl. No. 11/165,892, "Ensembles of Neural Networks with Different Input Sets", filed Jun. 24, 2005, 19 pgs.

US Final Office Action, dated Dec. 5, 2007, U.S. Appl. No. 10/393,641, "Neural Network Training Data Selection Using Memory Reduced Cluster Analysis for Field Model Development", filed Jun. 8, 2006, 33 pgs.

US Non-Final Office Action, dated Jan. 20, 2006, U.S. Appl. No. 10/393,641, "Neural Network Training Data Selection Using Memory Reduced Cluster Analysis for Field Model Development", filed Jun. 8, 2006, 42 pgs.

US Non-Final Office Action, dated Mar. 20, 2008, U.S. Appl. No. 11/270,284, "Well Logging with Reduced Usage of Radiosotopic Sources", filed Nov. 9, 2005, 10 pgs.

US Non-Final Office Action, dated Mar. 24, 2011, U.S. Appl. No. 12/048,045, "Neural-Network Based Surrogate Model Construction Methods and Applications Thereof", filed Mar. 13, 2011, 39 pgs.

US Non-Final Office Action, dated Apr. 9, 2008, U.S. Appl. No. 11/165,892, Ensembles of Neural Networks with different input sets, filed Jun. 24, 2005, 54 pgs.

US Non-Final Office Action, dated Jun. 8, 2007 U.S. Appl. No. 11/270,284, "Well Logging with Reduced Usage of Radiosotopic Sources", filed Nov. 9, 2005, 20 pgs.

US Non-Final Office Action, dated Jul. 9, 2007, U.S. Appl. No. 10/393,641, "Neural Network Training Data Selection Using Memory Reduced Cluster Analysis for Field Model Development", filed Jun. 8, 2006, 34 pgs.

US Non-Final Office Action, dated Aug. 28, 2007, U.S. Appl. No. 11/165,892, "Ensembles of Neural Networks with Different Input Sets": filed Jun. 24, 2005, 30 pgs.

US Non-Final Office Action, dated Oct. 20, 2006, U.S. Appl. No. 10/811,403, "Genetic Algorithm Based Selection of Neural Network Ensemble for Processing Well Logging Data", filed Mar. 26, 2004, 11 pgs.

US Non-Final Office Action, dated Nov. 24, 2008, U.S. Appl. No. 11/270,284, PCT/US006/25029, "Well Logging with Reduced Usage of Radiosotopic Sources", filed Nov. 9, 2005, 23 pgs.

Zhou, Zhi-Hua "A Study on Polynomial Regression and Gaussian Process Global Surrogate Model in Hierarchical Surrogate-Assisted Evolutionary Algorithm", IEEE Congress on Evolutionary Computation, Edinburgh, United Kingdom, (Sep. 2005), 6 pgs.

* cited by examiner

NEURAL-NETWORK BASED SURROGATE MODEL CONSTRUCTION METHODS AND APPLICATIONS THEREOF

CROSS REFERENCE TO RELATED APPLICATIONS

The present application claims priority to U.S. Pat. App. 60/894,834, entitled "Neural-Network Based Surrogate Model Construction Methods and Applications Thereof" filed Mar. 14, 2007 by inventors Dingding Chen, Allan Zhong, Syed Hamid, and Stanley Stephenson, which is hereby incorporated herein by reference.

BACKGROUND

The following references are helpful to understand the present disclosure and are hereby incorporated herein by reference:

[1] Y. S. Ong, P. B. Nair, and A. J. Keane, "Evolutionary optimization of computationally expensive problems via surrogate modeling," *AIAA Journal*, vol. 41, No. 4, 2003, pp. 687-696.

[2] K. Hamza and K. Saitou, "Vehicle crashworthiness design via a surrogate model ensemble and a co-evolutionary genetic algorithm," *Proc. of ASME International Design Engineering Technical Conferences & Computers and Information in Engineering Conference*, Long Beach, Calif., September 2005.

[3] S. Obayashi, D. Sasaki, Y. Takeguchi, and N. Hirose, "Multiobjective evolutionary computation for supersonic wing-shape optimization," *IEEE Transactions on Evolutionary Computation*, vol. 4, No. 2, 2000, pp. 182-187.

[4] Z. Zhou, Y. S. Ong, M. H. Nguyen, D. Lim, "A study on polynomial regression and Gaussian process global surrogate model in hierarchical surrogate-assisted evolutionary algorithm," *Proc. of IEEE Congress on Evolutionary Computation, Edinburgh*, United Kingdom, September 2005.

[5] S. Dutta, D. Misra, R. Ganguli, B. Samanta and S. Bandopadhyay, "A hybrid ensemble model of Kriging and neural networks for ore grade estimation," *International Journal of Surface Mining, Reclamation and Environment*, vol. 20, no. 1, 2006, pp. 33-45.

[6] J. M. Twomey and A. E. Smith, "Committee networks by resampling," in *Intelligent Engineering Systems through Artificial Neural Networks*, C. H. Dagli, M. Akay, C. L. P. Chen, B. R. Fernandez and J. Ghosh, Eds. ASME Press, 1995, vol. 5, pp. 153-158.

[7] A. Krogh, J. Vedelsby, "Neural network ensembles, cross validation, and active learning," in *Advances in Neural Information Processing System 7*, Cambridge, Mass.: MIT Press, 1995, pp. 231-238.

[8] G. Brown, J. Wyatt, R. Harris and X. Yao, "Diversity creation methods: A survey and categorization," *Journal of Information Fusion*, vol. 6, no. 1, January 2005, pp. 5-20.

[9] Y. Liu, X. Yao, "Ensemble learning via negative correlation," *Neural Networks*, vol. 12, pp. 1399-1404.

[10] M. Islam, X. Yao, "A constructive algorithm for training cooperative neural network ensembles," vol. 14, no. 4, pp. 820-834.

[11] G. P. Coelho and F. J. Von Zuben, "The influence of the pool of candidates on the performance of selection and combination techniques in ensembles," in *Proc. of the International Joint Conference on Neural Networks*, Vancouver, BC, Canada, 2006, pp. 10588-10595.

[12] J. Torres-Sospedra, M. Femandez-Redondo, and C. Hernandez-Espinosa, "A research on combination methods for ensembles of multilayer feedforward," *Proc. of International Joint Conference on Neural Networks*, 2005, pp. 1125-1130

[13] D. Chen, J. A. Quirein, H. D. Smith, S. Hamid, J. Grable, "Neural network ensemble selection using a multi-objective genetic algorithm in processing pulsed neutron data," *Society of Petrophysicists Well Log Analysts (SPLWA)45th Annual Logging Symposium*, Jun. 6-9, 2004, Noordwijk, The Netherlands.

[14] D. Chen, J. A. Quirein, H. Smith, S. Hamid, J. Grable, and S. Reed, "Variable input neural network ensembles in generating synthetic well logs," *Proc. of International Joint Conference on Neural Networks*, Vancouver, BC, Canada, 2006, pp. 2273-2280.

[15] Y. Jin, T. Okabe, and B. Sendhoff, "Neural network regularization and ensembling using multi-objective evolutionary algorithms," in *Proc. Congress on Evolutionary Computation*, Portland, Oreg., 2004, pp. 1-8.

[16] H. A. Abbass, "Pareto neuro-evolution: Constructing ensemble of neural networks using multi-objective optimization," in *Proc. Congress on Evolutionary Computation*, Can berra, Australia, 2003, pp. 2074-2080.

[17] A. Chandra and X. Yao, "DIVACE: Diverse and accurate ensemble learning algorithm," in *The Fifth International Conference on Intelligent Data Engineering and Automated Learning*, Exeter, UK, 2004, pp. 619-625.

[18] P. Castillo, M. Arenas, J. Merelo, V. Rivas, and G. Romero, "Multiobjective optimization of ensembles of multilayer perceptrons for pattern classification," in *Parallel Problem Solving from Nature IX*, Reykjavik, Iceland, 2006, pp. 453-462.

[19] Y. Jin, M. Olhofer, and B. Sendhoff, "A framework for evolutionary optimization with approximate fitness functions," *IEEE Transactions on Evolutionary Computation*, vol. 6, no. 5, 2002, pp. 481-494.

[20] B. S. Yang, Y. Yeun, and W. Ruy, "Managing approximation models in multiobjective optimization," in *Structure and Multidisciplinary Optimization*, vol. 24, no. 2, 2002, pp. 141-156.

[21] R. Maclin, J. W. Shavlik, "Combining the predictions of multiple classifiers: using competitive learning to initialize neural networks," in *Proc. of the 14th International Joint Conference on Artificial Intelligence*, Montreal, Canada, 1995, pp. 524-530.

[22] P. Sollich and A. Krogh, "Learning with ensembles: how over-fitting can be useful," in *Advances in Neural Information Processing Systems 8*, D. S. Touretzky, M. C. Mozer, and M. E. Hasselmo, Eds. Cambridge, Mass.: MIT Press, 1996, pp. 190-196

[23] R. S. Renner, "Combining constructive neural networks for ensemble classification," in *Proc. Of the International Joint Conference on Intelligent System*, Atlantic City, N.J., 2000, pp. 887-891.

Usage of high-fidelity simulation tools such as Finite Element Analysis (FEA) and Computational Fluid Dynamics (CFD), for example, has become standard practice in engineering today. However, the expensive computational cost associated with running such simulation tools is often prohibitive, preventing engineers from conducting enough simulations to discern an optimal design. To address this issue and facilitate product optimization, engineers have in some cases developed surrogate models that are computationally efficient, robust, and can be used for preliminary analysis before unleashing the high-fidelity simulation tools on selected designs. The surrogate models can be incorporated into a search engine to locate potentially feasible designs and to identify design problem areas [1-3].

Several surrogate modeling techniques (neural networks, polynomial regression, Gaussian process, etc.) are available today. The most suitable surrogate model technique will vary based on the specific problem and the engineer's experience [4-5], and the performance of the various techniques can be expected to vary significantly when only a limited amount of design data is available from which to develop the surrogate model. In neural network modeling, for example, an overtrained neural network developed under sparse data conditions will memorize the training data and fail to generalize well on the unseen new data. However, an under-trained neural network whose development is terminated by conventional early-stopping will perform poorly even on the given training examples. Traditionally, the prediction error of a neural network generated from sparse data has been estimated using resampling based cross-validation (leave-one-out) and bootstrap methods [6]. When only a single neural network is employed, the estimated prediction error is usually quite high.

Compared to single neural networks, neural network ensembles offer a more robust surrogate model by combining multiple predictions from diverse member networks. Many studies in this area are related to incorporative training (ambiguity decomposition [7-8], negative correlation learning [9-10]) and selection/combination methods [11-12], but less attention has been paid to surrogate model development from sparse data.

BRIEF DESCRIPTION OF THE DRAWINGS

A better understanding of the various disclosed embodiments can be obtained when the following detailed description is considered in conjunction with the following drawings, in which.

Figure 1:
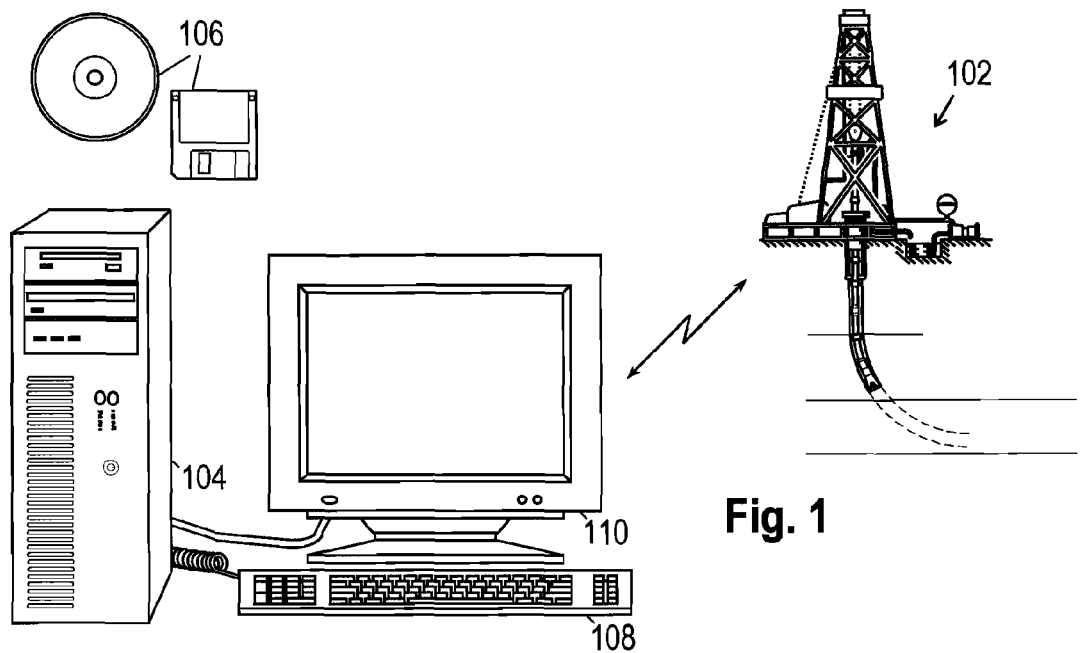
FIG. 1 shows an illustrative surrogate model development environment.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Various neural-network based surrogate model construction methods are disclosed herein, along with various applications of such surrogate models. Designed for use when only a sparse amount of data is available (a "sparse data condition"), some embodiments of the disclosed systems and methods: create a pool of neural networks trained on a portion of a sparse data set; generate for each of various multi-objective functions a set of neural network ensembles that minimize the multi-objective function; select a local ensemble from each set of ensembles based on data not included in the training process; and combine a subset of the local ensembles to form a global ensemble. This approach enables usage of larger candidate pools, multi-stage validation, and a comprehensive performance measure that provides more robust predictions in the voids of parameter space.

The set of neural network ensembles may be generated using evolutionary selection based on a multi-objective function that assigns different weighting factors to balance ensemble fidelity, complexity, and ambiguity. We call this scheme fidelity, complexity, and ambiguity based ensemble selection (FCAES). This approach is different from other reported approaches dealing with ensemble related multi-objective learning such as minimizing the regularized fitness function [15], minimizing prediction errors on both pure training data and noise added data [16], optimizing ensemble prediction accuracy and member network diversity [17], and optimizing the type I (false positive) and type II (false negative) errors for pattern classification [18]. Our sparse data ensemble construction approach is better characterized as an evolutionary selection/combination scheme rather than a learning/training approaches of other references. The combination of local ensembles is beneficial because the local ensembles provide multiple solutions with similar results over known data samples, but significantly different extrapolations over large voids outside of the available data. The global ensemble is generally capable of providing not only an improved prediction over the available validation data, but also a better generalization throughout the data voids. Compared with other methods in literature for managing approximation models and improving the model fidelity in the trust-region through evolutionary optimization [19-20], our approach has the potential to extend the region of robust prediction with low-complexity framework.

Turning now to the figures, FIG. 1 shows an illustrative surrogate model development environment. In the illustrative environment, an engineer is given responsibility for developing or improving the performance of a tool for use in a completion system 102. The engineer's tools include a computer 104 and software (represented by removable storage media 106), which they control via one or more input devices 108 and output devices 110. The software is stored in the computer's internal memory for execution by one or more processors. The software configures the processor to accept commands and data from the engineer, to process the data in accordance with one or more of the methods disclosed below, and to responsively provide predictions for the performance of the tool being developed or improved.

Upon receiving the predictions via output device 110, the engineer can select certain tool parameters for further analysis and/or implementation. In alternative system embodiments, the predictions are subject to further processing and/or verification before being provided in a perceptible form to a user. For example, the predictions of a surrogate model can be displayed graphically to the user, but they might alternatively be systematically searched internal to the computer to identify one or more optimal regions for verification by a high-fidelity simulation model. When verified, the optimal solution could be displayed to a user, or alternatively a subsequent process could use the solution to determine a useful and tangible effect. As just one example, the optimal solution may indicate a particular tool configuration that the computer then generates using a rapid prototyping machine (sometimes referred to as a '3D printer'). As another example, the computer may use the predictions of a surrogate model to generate perceptible signals for controlling or communicating with an external system.

An expandable pipe is an example of a tool for use in a borehole after it has been drilled. The expandable pipe is a part of a subterranean well screen that is useful for sand control in oil and gas production. Typical well screens include a tubular base pipe with a series of rows of holes perforated through a sidewall of the base pipe, and a filtering media disposed externally on the base pipe. Drilling techniques and equipment exist today to expand a screen with a fixed cone methodology in the well to place the screen in intimate contact with the borehole wall. Modern well completion systems often install expandable screens to reduce the mobility of the sand within the formation, minimize the occurrence of borehole collapse, facilitate production control, and provide zonal isolation with increased internal space for the tool string.

Figure 2:
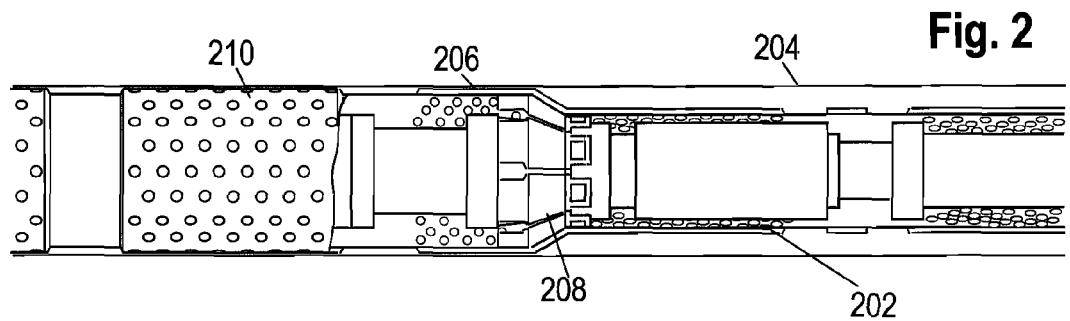
FIG. 2 shows an illustrative expandable screen tool suitable for sand control in a well.

FIG. 2 illustrates the operation of expandable pipe. An expandable pipe 202 is inserted into a borehole 204 and expanded to the borehole diameter 206 via motion of a hydraulically powered expander 208 to produce a perforated screen 210 seated against the wall of the borehole. Such products are available commercially under the brand names PoroFlex, VersaFlex, and SSSV.

One crucial risk in expandable screen design is expansion failure of the base pipe, which may result from improper geometric parameter and material selection or other manufacturing factors. In contrast to expansion failure, the optimal design allows a high expansion rate while maintaining the tensile and collapse strength of the perforated base pipe. Conventional engineering approaches primarily involve high-fidelity finite element analysis (FEA) applied to the selected hole patterns on the base pipe. However, since the computational cost for FEA modeling is high, the final design might be sub-optimal due to limited number of simulations. Thus, expandable screen design will be used as a case study and discussed as an aid to understanding the surrogate model design methods disclosed herein.

Figure 3:
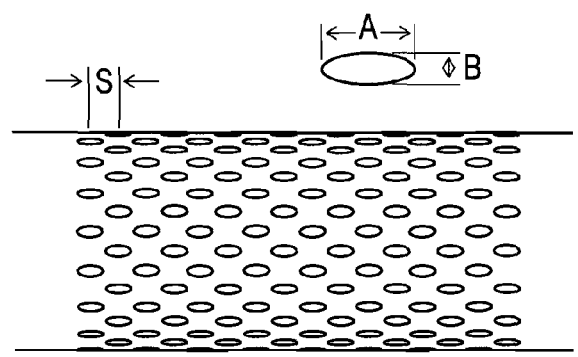
FIG. 3 shows some of the parameters that define the expandable pipe design space.

FIG. 3 shows geometric parameters for expandable base pipe. The hole is generally elliptical, with a and b the major and minor axes respectively. (Note, however, that the model does not require the "major" axis a to be greater than the "minor" axis b. Alternative terminology might be "longitudinal" and "circumferential" axes a and b.) The parameter s is the axial spacing between the circular rows, and HPC is the number of holes per circular row. The initial pipe thickness and diameter are fixed constants. The selected range of geometric parameters is 0.25-0.60 inches for a and b, 1-4 inches for s and 3-18 holes for HPC.

Figure 4:
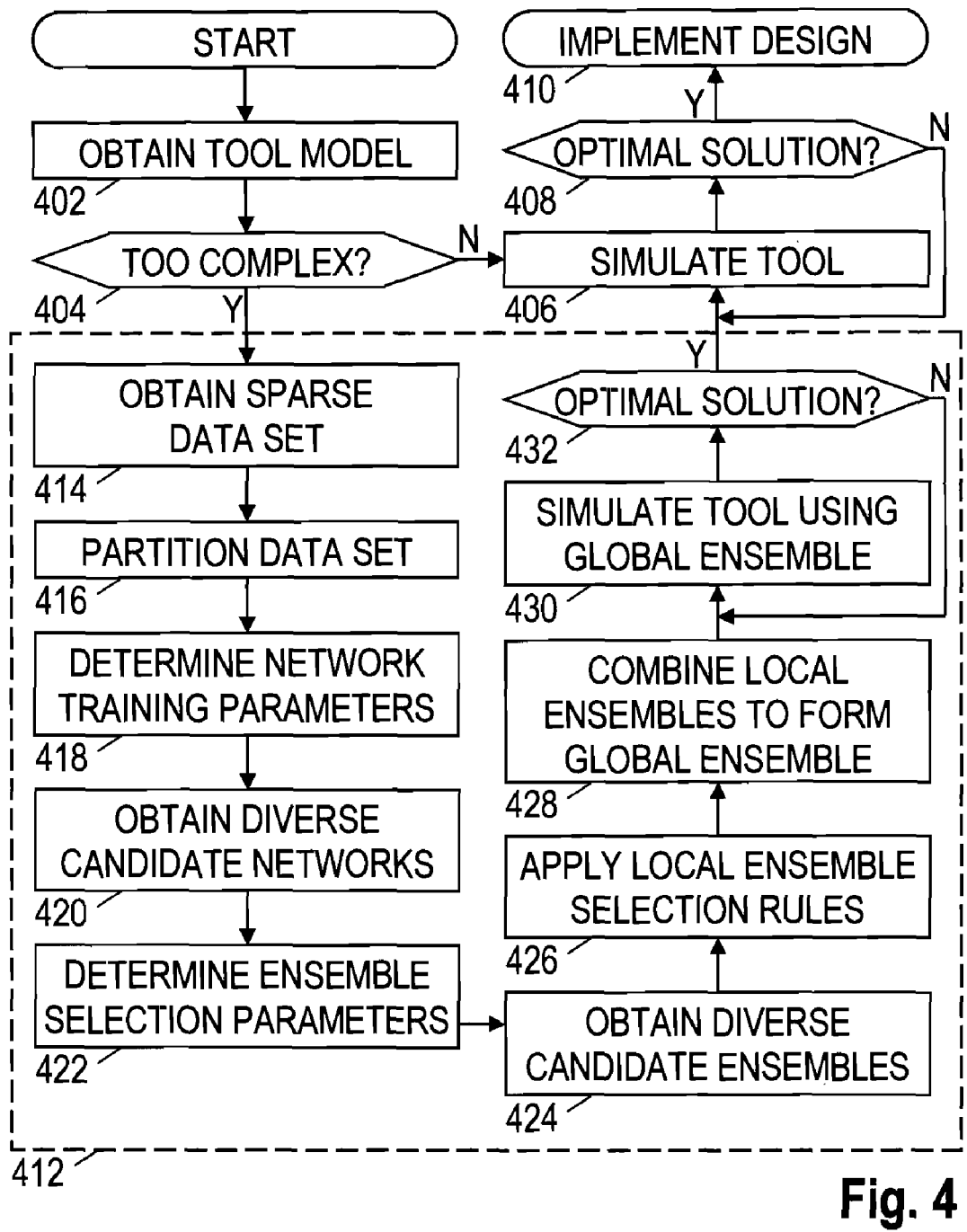
FIG. 4 is a flowchart of an illustrative tool construction method using a neural network based surrogate model.

FIG. 4 is a flowchart of an illustrative tool design method. Beginning in block 402, a model is constructed to predict the tool's performance. For the present case study, the existing FEA model serves this role. The FEA model takes the four parameters in the design space as input variables, and performs a simulation to measure the resulting plastic strain and tensile load at the given expansion rate.

In block 404, the engineer determines whether this model is too complex, e.g., whether an excessive amount of time will be required to fully explore the solution space to identify an optimal solution. If the model is not too complex, a computer simulates the tool's performance in block 406 for different parameter values until an optimal solution is identified in block 408. The computer displays the optimal solution to the engineer in block 410 for use in implementing the tool. In the present case study, the optimal solution will be one or more values of parameters a, b, s, and HPC that provide a maximum tensile load while minimizing plastic strain, thereby indicating the perforated screen configuration having a minimum chance of expansion failure.

Depending on the complexity of the model, the size of the parameter search space, and the step sizes for each parameter, the engineer may determine in block 404 that a full exploration of the solution space with the high fidelity model is infeasible. In that event, a surrogate model construction process 412 is performed to identify a much smaller subspace for usage in blocks 406 and 408. In some embodiments, the subspace consists of the parameter values identified as optimal by the surrogate model, plus one step size in each direction to verify that the solution is at least a locally optimum value.

Process 412 begins with the engineer obtaining a sparse data set from the high-fidelity tool model. In the illustrative case study, results from a total of 62 FEA simulations were obtained for use in developing a surrogate model. These 62 data points were partitioned in block 416 into two disjoint data sets. About 10-25% of the data points are excluded from the primary data set and used to form the secondary data set. In the present case study, 52 data points are put into primary data set, and 10 data points are put into the secondary data set. The primary data set is then used to form multiple training sets, using a "leave-H out" approach, meaning that a different selection of H data points is left out of each training set. In the present case, eight training sets were used, each having 46 data points.

Figure 5:
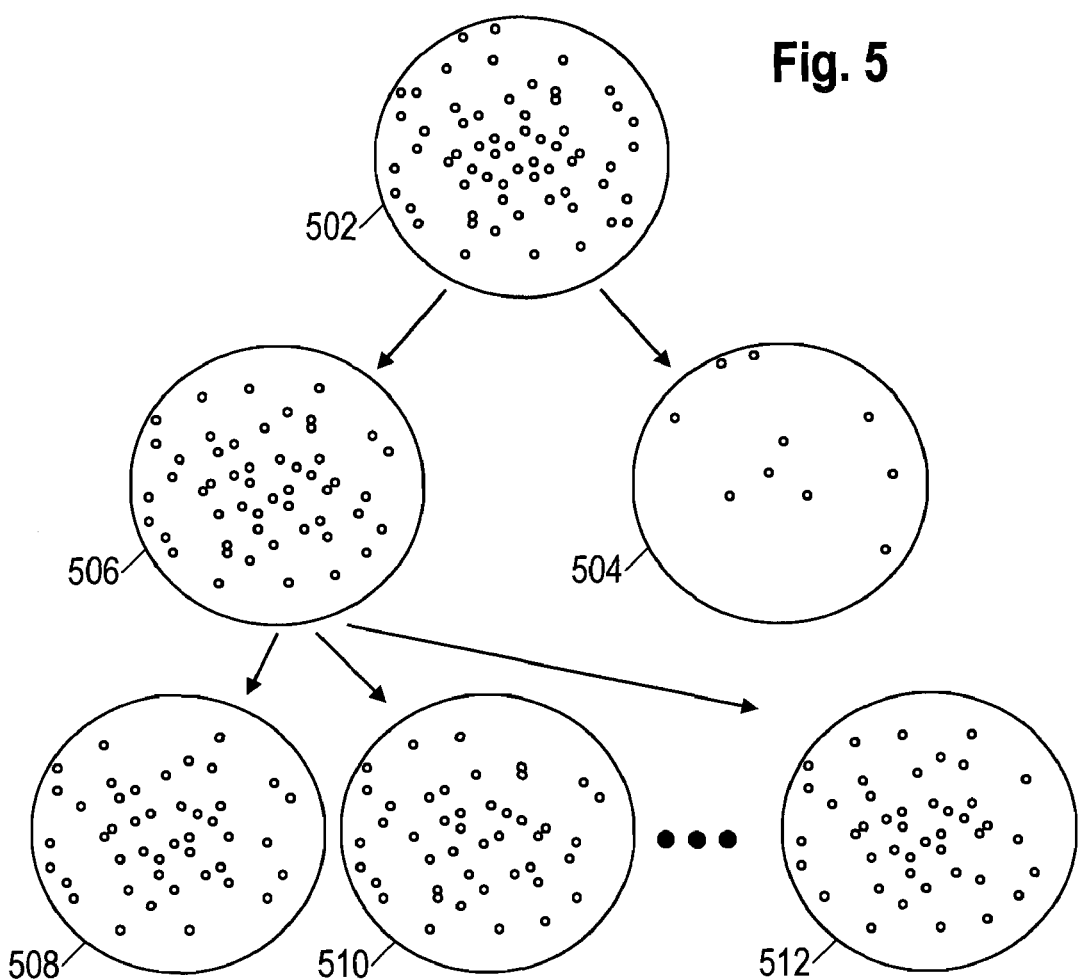
FIG. 5 shows an illustrative division of a data set into subsets.

FIG. 5 shows a data set tree illustrating this process of subdividing the data set. Set 502 includes 62 points, each representing a six-element vector (with four elements for inputs a, b, s, and HPC, and two elements for the plastic strain and tensile load outputs). Secondary data set 504 contains 10 data points that have been removed from set 502 to form primary data set 506. Eight different training data sets 508-512 are then obtained by omitting a different random selection of six data points from the primary data set.

Returning to FIG. 4, the computer selects parameters to form a pool of neural network candidates in block 418. The size of the pool may be conveniently set to 32, 64, or 128 neural networks because these numbers can be conveniently represented using binary numbers in the evolutionary selection algorithm. The purpose of selecting different training parameters for each neural network is to create diversity in the candidate pool. Many suitable techniques for generating neural network candidates are available today in training multi-layer feed-forward networks with adequate diversity [21-23]. Illustrative training variations can include: varying the number of hidden nodes in the neural network, varying the number of hidden layers in the network, varying the training data set, randomly varying the starting values of neural network coefficients, and randomly varying noise added to the training inputs and/or outputs.

Figure 6:
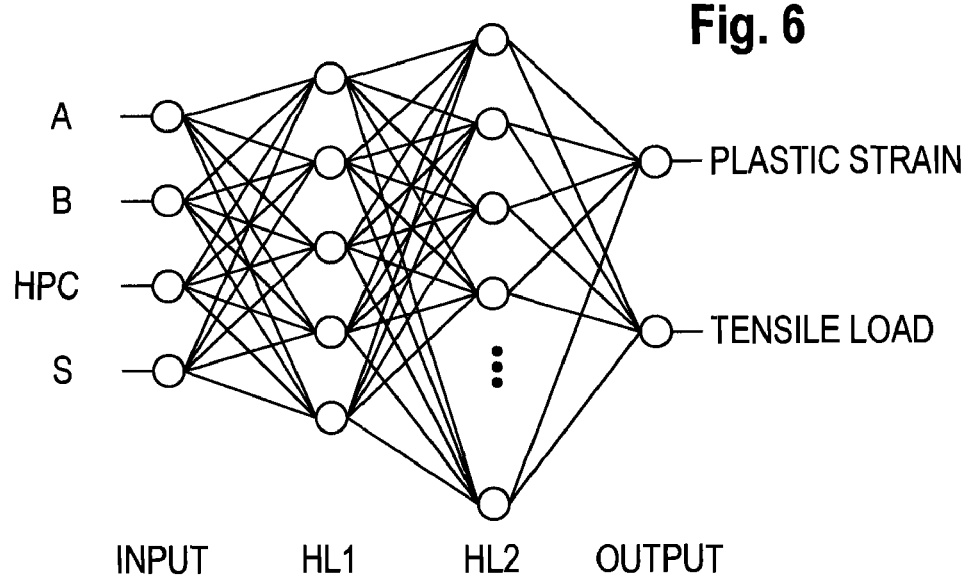
FIG. 6 shows an illustrative neural network architecture.

FIG. 6 shows an illustrative neural network architecture for the perforated screen example. The illustrative network includes an input layer with four nodes (one for each input a, b, s, and HPC), a first layer with five hidden nodes, a second layer with a variable number of hidden nodes, and an output layer with two nodes (one for each output Plastic Strain and Tensile Load). The input nodes simply reproduce their input values. The output nodes produce a linear combination of their inputs. All of the hidden nodes output the hyperbolic tangent of a weighted sum of their inputs and an adjustable offset. Some neural network embodiments have only one hidden layer. Note that each neural network in the candidate pool accepts the same inputs and provides predictions for the same outputs. In one experiment for the present case study, four different neural network structures were used in combination with eight different training data sets, for a total of 32 neural network candidates. In another experiment, eight different neural network structures were used in combination with sixteen different data sets for a total of 128 neural network candidates.

Returning again to FIG. 4, the computer trains a set of neural networks in block 420, varying the training parameters for each network. In each case, the neural network is given adequate training time, with appropriate control on training epochs and network complexity. By varying the training parameters, the computer obtains a pool of unique neural networks that each perform adequately over their respective training sets.

Figure 7:
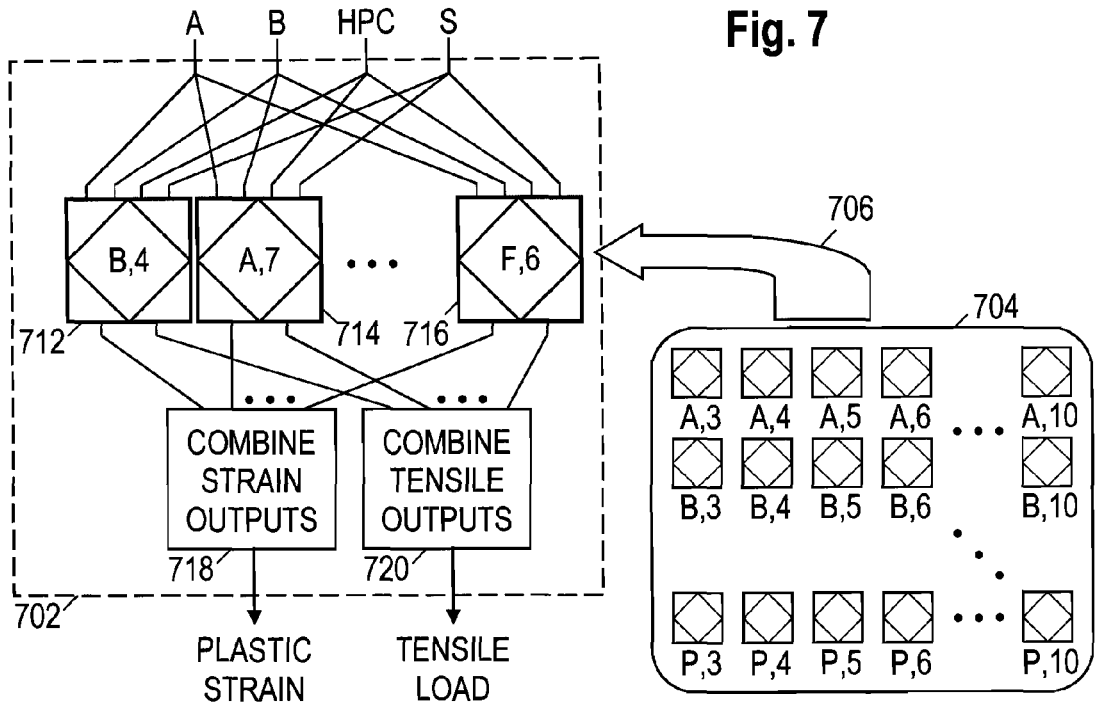
FIG. 7 shows an illustrative ensemble architecture.

In block 422, the computer formulates a diverse set of evolutionary selection parameters to form a pool of candidate ensembles. As with the pool of candidate networks, it is desirable to provide a pool of candidate ensembles with sufficient diversity. FIG. 7 shows an illustrative neural network ensemble 702 formed by selecting multiple neural networks from candidate pool 704. In the illustrated example, the neural networks in pool 704 are indexed by training data set (A-P) and by number of hidden nodes in the second hidden layer (3-10). An evolutionary selection algorithm, represented by arrow 706, determines the combination of neural networks 712-716 that form ensemble 702. The inputs to each neural network ("member") of the ensemble are the same, and the outputs of each member are combined as represented by blocks 718 and 720. Usually, blocks 718 and 720 average the corresponding outputs of each neural network 712-716, but in some embodiments a weighted average is taken. However, other statistical combination techniques can be employed, including root mean square, inverse mean inverse, average after excluding maximum and minimum values, etc. The outputs of blocks 718 and 720 are the predictions of the ensemble responsive to the inputs.

In some method embodiments, the computer uses a fidelity, complexity, and ambiguity evolutionary selection (FCAES) algorithm to create many candidate ensembles with fixed size (i.e., each candidate ensemble includes the same number of neural networks). To achieve diversity, the computer assigns different combinations of weighting factors (as explained further below) for ensemble validation error, ensemble complexity and ensemble negative correlation or ambiguity. This variation in weighting factors is one distinguishing factor over previous studies [13-14] in which the weighting factors were fixed. The computer then applies the different evolutionary selection parameters to construct the candidate ensemble pool in block 424.

The process carried out by the computer in block 424 (FIG. 4) is now explained in detail. The computer selects neural networks from the candidate pool by multiple runs of a genetic algorithm to form a pool of local neural network ensembles. The multi-objective performance function to be minimized during evolutionary computation is a weighted form of three measurements:

$$f = k_1 \times \text{EMSE} + k_2 \times \overline{\text{SSW}} \pm k_3 \times \overline{P} \quad (1)$$

In equation (1), EMSE is the ensemble mean-squared-error measured on the validation data set (in the present case study, the validation data set is the primary data set 506), $\overline{\text{SSW}}$ is the ensemble sum-squared-weights averaged over networks in the ensemble (the "member networks"), $\overline{P}$ is the ensemble ambiguity in the batch-mode form (as defined further below), and $k_1$, $k_2$ and $k_3$ are normalized coefficients with summation $k_1 + k_2 + k_3 = 1$.

The ensemble batch-mode ambiguity is an extension of Krogh and Vedelby's network ambiguity [7] for a single data point $$P(n) = \frac{1}{M} \sum_i (F_i(n) - \overline{F}(n))^2 \quad (2)$$

where $F_i(n)$ and $\overline{F}(n)$ are the output of the $i^{th}$ individual neural network and the output of the ensemble, respectively, for the $n^{th}$ sample. P(n) is averaged over M member networks. For multi-output neural network, we can obtain batch mode ensemble ambiguity by averaging P(n) over number of samples c and number of outputs r $$\overline{P} = \frac{1}{(c \times r)} \sum_{n=1}^{c} \sum_{k=1}^{r} P(n_k) \quad (3)$$

Note that the ensemble ambiguity defined in equation (3) and the ensemble negative correlation described in [14] are same in magnitude but different in sign. The multi-objective function used in FCAES provides a comprehensive measure of ensemble prediction accuracy on the given data (EMSE), ensemble complexity ($\overline{\text{SSW}}$), and ensemble diversity ($\overline{P}$). Increasing $k_1$ will put more focus on the ensemble prediction accuracy of the given data set. The coefficient $k_2$ is an ensemble regularization parameter. Although regularization is not an explicit concern for training candidate networks in this method, it could provide additional controllability and flexibility in creating candidate ensembles. Putting a minus sign before $k_3$ will encourage diversity among the member networks, while choosing a plus sign will penalize the diversity. Under sparse data conditions, it is preferred to run FCAES repeatedly with different performance function weights. The other settings that have been employed for running FCAES in the present case study include a fixed ensemble size (5 member networks), population size (60 ensembles), generation number (30 generations), and eight different sets of coefficients $k_1$, $k_2$, and $k_3$ for evaluating the weighted performance function. (To test the sensitivity to each of these values, multiple experiments were also run with different values in this case study.) After each run, the ranked ensembles from the final generation are saved for further processing.

Figure 8:
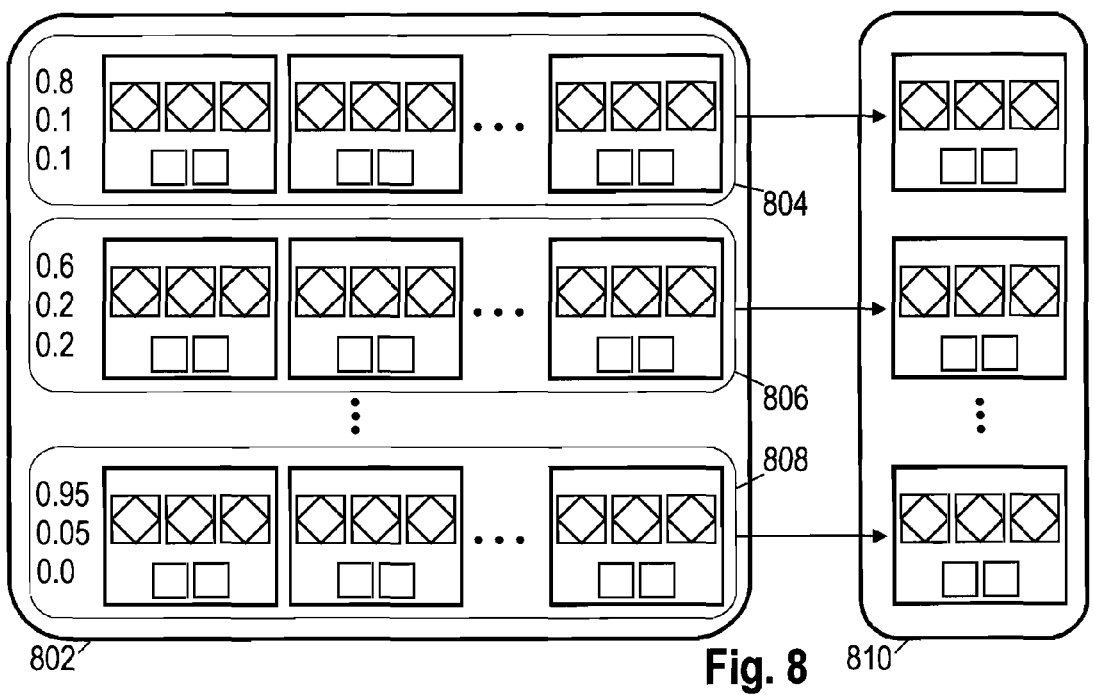
FIG. 8 shows an illustrative determination of local ensembles.

To this point (block 424 of FIG. 4), the neural network training and ensemble selection have been performed using the primary data set. In block 426, the secondary data set is used to select local ensembles from the pool of neural network ensembles developed in block 424. As shown in FIG. 8, the ensemble candidate pool 802 includes the final generations 804-808 from each setting of the weighting coefficients $k_1$, $k_2$, and $k_3$. A pool of local ensembles 810 is formed by selecting one local ensemble from each final generation 804-808. That is, each local ensemble is selected from a group of candidate ensembles derived based on a given set of parameters $k_1$, $k_2$ and $k_3$ during evolutionary selection. Thus the total number of local ensembles in pool 810 obtained will equal the number of settings of $k_1$, $k_2$ and $k_3$, at the previous stage.

To select each local ensemble, the mean-squared error of the ensemble predictions for the secondary data set is measured for each of the ensembles in each final generation, and the best-performing ensemble in each group 804-808 is selected as the local ensemble to represent that group. Since different objective functions and data sets are used in blocks 424 and 426 (FIG. 4), the ensemble which gives the minimum EMSE on the primary data set may not be the same one which minimizes the prediction error on the secondary data set. It is wise to monitor the EMSE on both data sets during local ensemble selection to evaluate whether the process should be re-started with a different primary-secondary data set division and/or different multi-objective weighting coefficients. The local ensembles determined in this way usually provide adequate diversity for global ensemble construction. In alternative method embodiments, different performance criteria over the secondary data set are used to select the local ensembles. For example, ensemble ambiguity may be desirable and hence included in the ensemble performance function.

In the present case study, the candidate ensemble selection was performed using FCAES algorithm. In one experiment, the objective function (see equation (1)) was used with five different sets of weighting coefficients $k_1$, $k_2$, and $k_3$. After 30 generations of evolutionary selection user each version of the objective function, the final generation (having 32 ensembles varied in members) were kept to form the candidate ensemble pool. The computer then selected a local ensemble for each setting of the objective function, based on the candidates' performance on the secondary data set. Table 1 summarizes the characteristics of the local ensembles. The index range of member networks is from 0 to 31 (32 network candidates), and the validation error is calculated by percentage of absolute difference between the ensemble output (each ensemble outputs the average of the outputs of the five member networks) and the FEA simulated output.

TABLE I

SELECTED LOCAL ENSEMBLES AND PREDICTION ERROR
ON THE SECONDARY DATA SET

| MOF Weighting Coefficients | Local Ensemble (member index) | Strain Error (%) | Load Error (%) |
|---|---|---|---|
| K = [1.0, 0.0, 0.0] | [7 10 18 19 23] | 9.73 | 5.94 |
| K = [0.8, 0.1, 0.1] | [5 19 29 29 30] | 8.51 | 4.97 |
| K = [0.7, 0.1, 0.2] | [7 18 23 27 28] | 9.54 | 4.95 |
| K = [0.7, 0.2, 0.1] | [7 10 14 19 30] | 7.67 | 6.95 |
| K = [0.6, 0.2, 0.2] | [14 18 19 19 27] | 8.77 | 5.18 |

Figure 9A:
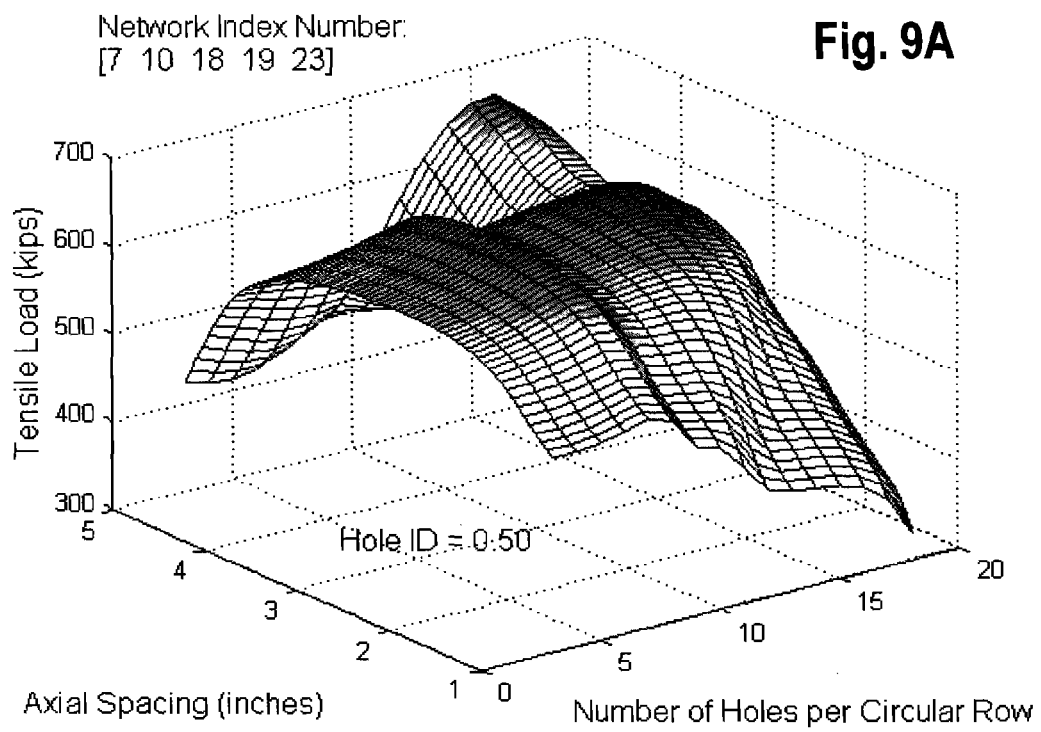
FIGS. 9A-9B illustrate the model predictions of two local ensembles.
Figure 9B:
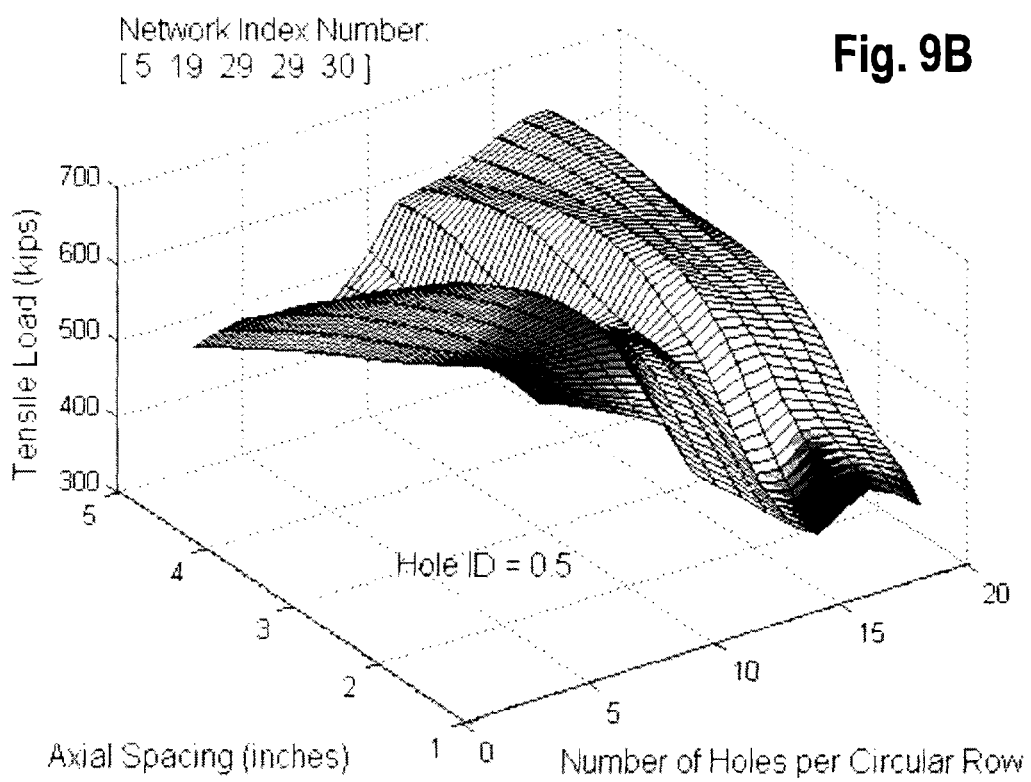

One problem associated with sparse data modeling is the existence of a large number of voids in the parameter space. We can see from Table 1 that the local ensembles' prediction error on either plastic strain or tensile load is smaller than 10%, which is well below the design tolerance. However, simulations applied on the voids of the data space show that the variance of prediction among the local ensembles is still significant. For example, FIGS. 9A and 9B respectively display the tensile load predicted using two different local ensembles assuming fixed dimensions for circular holes 0.5-inch in diameter. The tensile load predictions are shown as a function of axial spacing and the number of holes per circular row. Significant differences can be observed in the shapes of the resulting prediction surfaces.

Though the local ensembles each provide similar results in the given validation data space (the secondary data set), they may still give significantly different predictions in the large voids beyond the available data as a result of the FCAES approach, which provides specially defined fitness functions in different runs of an evolutionary selection algorithm. A global ensemble is helpful in reducing the local-ensemble-related variance and improving prediction over the whole parameter space. Accordingly, in block 428 of FIG. 4, local ensembles will be combined to form a global ensemble that is generally capable of providing not only the improved prediction over the available validation data, but also better generalization over the voids which can be justified from either visual inspection or an objective ambiguity measurement. Although there is no guarantee that global smoothing is the optimal method to reduce the prediction uncertainty on the unseen new data, experience suggests it probably is adequate. The separation of local ensemble selection and global ensemble determination also serves to reduce the cost in evolutionary computation.

Figure 10:
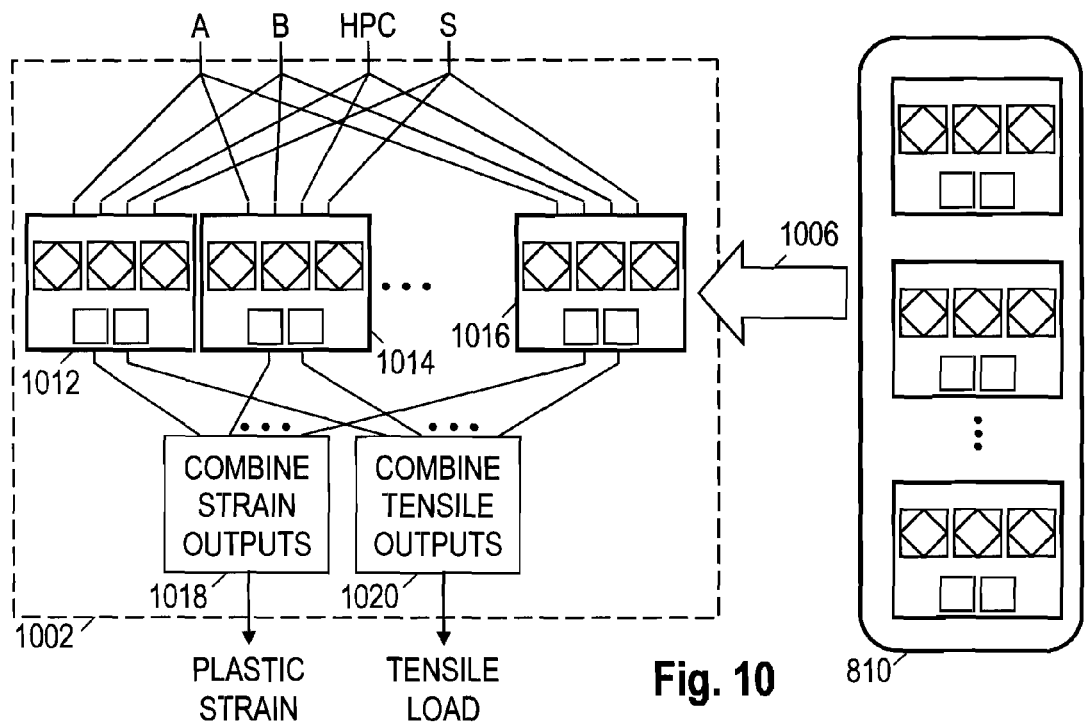
FIG. 10 shows an illustrative global ensemble architecture.

The global ensemble can be constructed by combining several local ensembles from ensemble pool 810 into a larger ensemble 1002 as shown in FIG. 10. Arrow 1006 represents the use of a selection algorithm such as graphic inspection, ambiguity selection, or FCAES. The global ensemble 1002 distributes the input values a, b, s, and HPC to each of the local ensembles 1012-1016 (and hence to each of the member networks in those local ensembles), and combines the respective Plastic Strain and Tensile Load outputs from the local ensembles using blocks 1018 and 1020 similar to blocks 718 and 720 described above.

To determine the best candidate local ensembles to be members of the global ensemble, we still use the given primary and secondary data sets as evaluation basis, plus some other virtual validation measure to aid in decision making. In one experiment, combinations of four local ensembles (selected from the pool of five ensembles given in Table 1) were evaluated using graphic inspection to select the global ensemble that provides the smoothest and most consistent prediction in the data space voids. Many predictions can be viewed in 2D, 3D, or even 4D graphics for anomaly identification. A good global ensemble should produce reasonably smooth predictions on both interpolated and extrapolated points of interest. The user may examine the predictions in terms of behaviors expected from experience or underlying principles. Graphical inspection could also help justify the need to acquire new training and testing data if simulation results are contrary to designer's anticipation. (Where graphic inspection is impractical, a gradient or other discontinuity measure can be used to measure prediction smoothness or consistency.)

An alternative virtual validation measure employed in this case study is ensemble ambiguity. The sample network ambiguity defined in equation (2) can be calculated without knowledge of the true output values—it simply measures the degree by which the member network predictions deviate from the (global) ensemble's prediction. Thus ensemble ambiguity can be used to evaluate the performance of the global ensemble when no additional testing data is available. By choosing some possible inputs of interest in the voids of parameter space, different global ensembles having similar prediction errors over the entire data set 502 can be compared on the basis of their global ensemble ambiguity. The global ensemble with higher ambiguity, indicating higher negative correlation among the member networks, is a promising candidate. However, many exceptions exist, and other decision-making methods can be considered.

Returning to the case study—the local ensembles from Table 1 were combined in groups of four to construct a large global ensemble (20 member networks) to reduce prediction variance. Five global ensemble candidates are given in Table 2 which includes all possible four-member combinations. Table 2 also presents the simulated ensemble network ambiguity (NA) on four data sets, each spanning over a subspace of 1040 samples for a fixed hole size (0.325, 0.375, 0.45 and 0.5 inches in diameter). The last two columns are the calculated NA on all FEA examples (data set 502), and the overall validation error measured on the primary and secondary data sets.

TABLE 2

SIMULATED NETWORK AMBIGUITY IN VOIDS AND ENSEMBLE VALIDATION ERROR

| IndNum | Sim1NA (h0325) | Sim2NA (h0375) | Sim3NA (h0450) | Sim4NA (h0500) | Sim5NA (N1 + N2) | ValErr (%) |
|---|---|---|---|---|---|---|
| GNNE1 | 1.214 | 0.801 | 0.396 | 0.228 | 0.027 | 6.29 |
| GNNE2 | 1.162 | 0.753 | 0.357 | 0.214 | 0.022 | 6.20 |
| GNNE3 | 1.414 | 0.904 | 0.411 | 0.233 | 0.026 | 6.10 |
| GNNE4 | 1.334 | 0.855 | 0.390 | 0.224 | 0.023 | 6.27 |
| GNNE5 | 1.327 | 0.860 | 0.396 | 0.227 | 0.025 | 6.21 |

Table 2 reveals that the overall validation error measured on the given FEA examples (data set 502) is relatively insensitive to the choice of global ensemble, which demonstrates the robustness of the principle of using a large size ensemble for sparse data modeling applications. Table 2 also reveals that the NA measured on the voids (first four columns) has a significantly larger magnitude than that measured on the primary and secondary data sets. This explains why over-fitting in training individual neural network can be useful under sparse data condition when surrogate model ensemble is used.

We also note that the variance of NA between the data sets for different hole sizes is much larger than the variance within each data set, reflecting different levels of prediction uncertainty over the data space due to the training data distribution. Since certain regions may be more important than others, model refinement can be efficiently achieved by adding new FEA data points to fill those regions exhibiting large NA. On the other hand, within each simulated data set the ensemble exhibiting larger NA is often a more effective variance reducer. In Table 2, the ensemble GNNE3 produces consistently higher NA than others over the data space, yet its prediction errors on FEA examples and additional testing points are also the smallest.

Figure 11A:
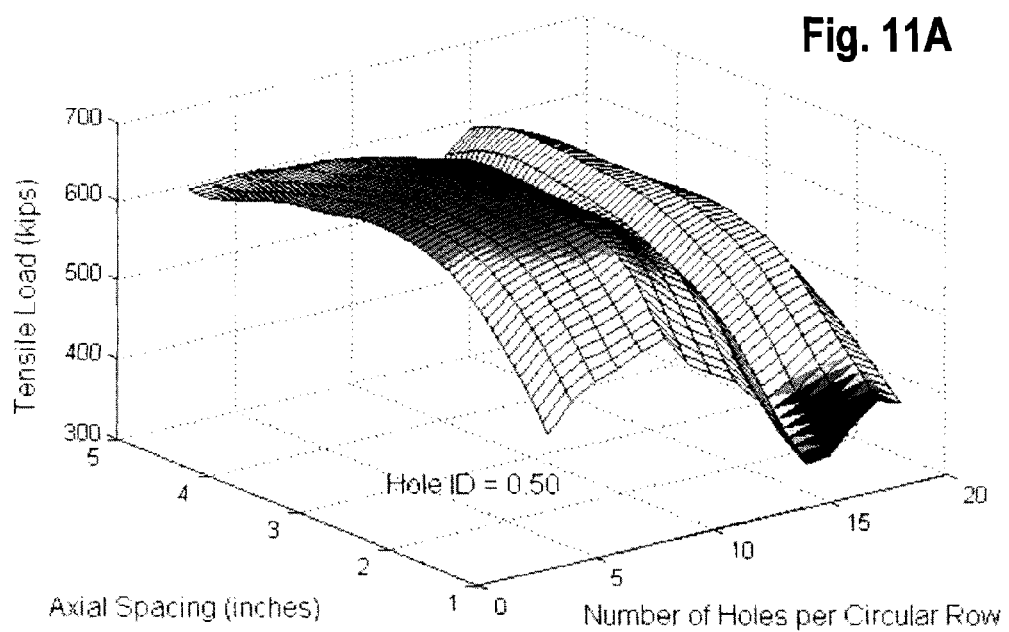
FIGS. 11A-11C show an illustrative global ensemble's tensile load predictions as a function of axial spacing and holes per circular row.
Figure 11B:
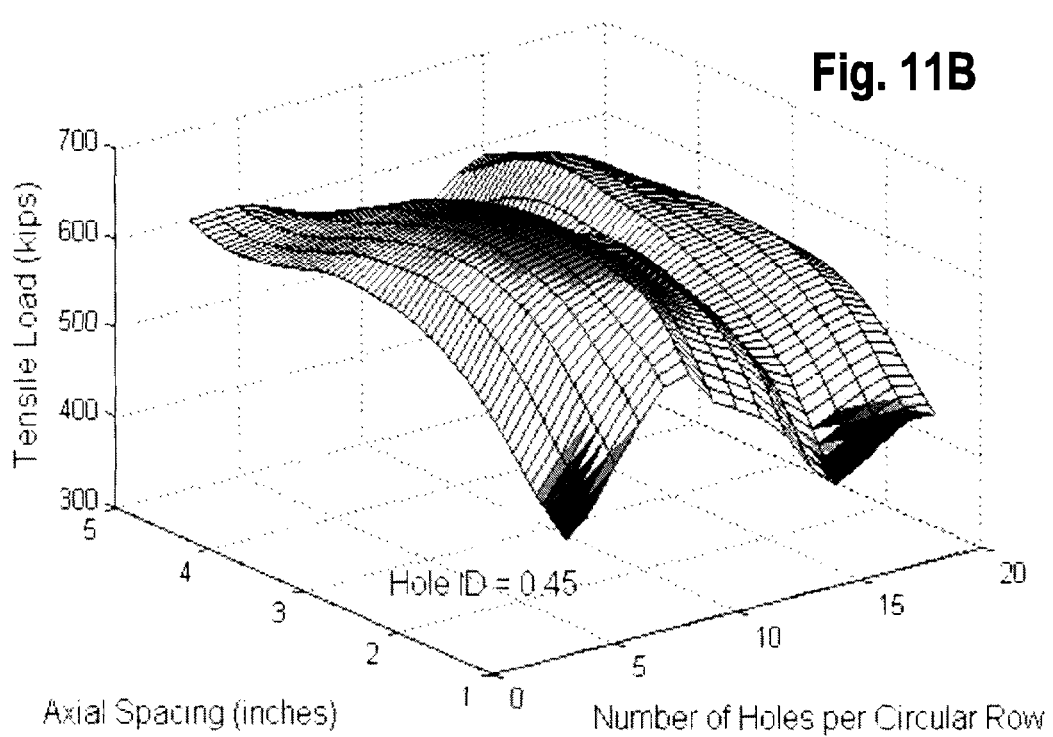
Figure 11C:
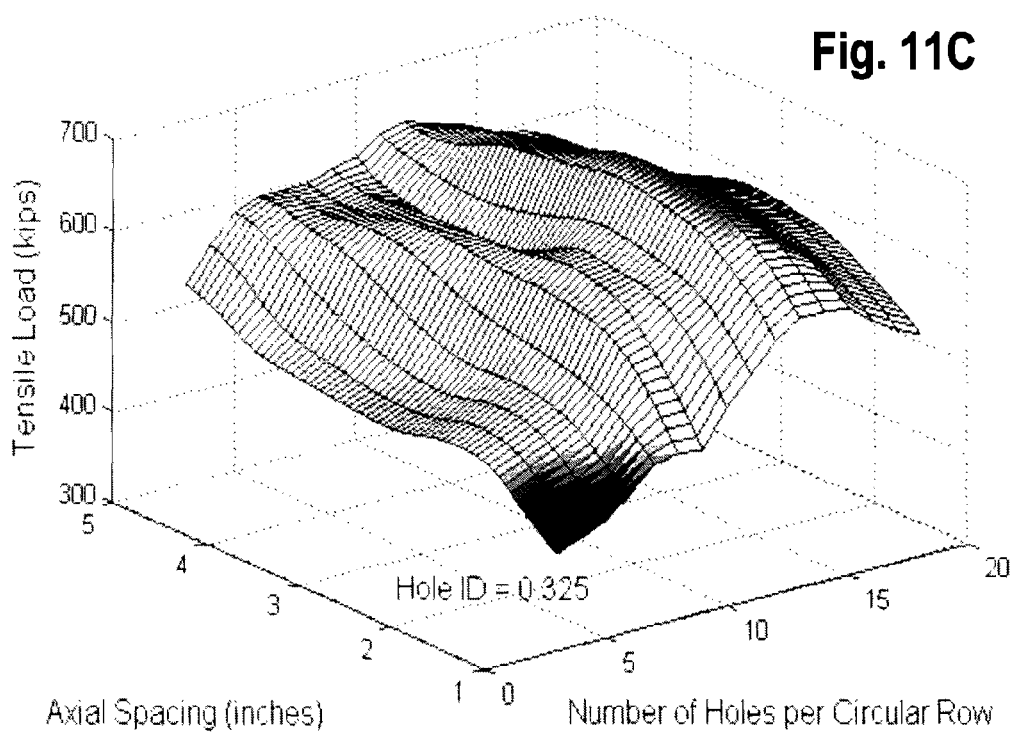
Figure 12A:
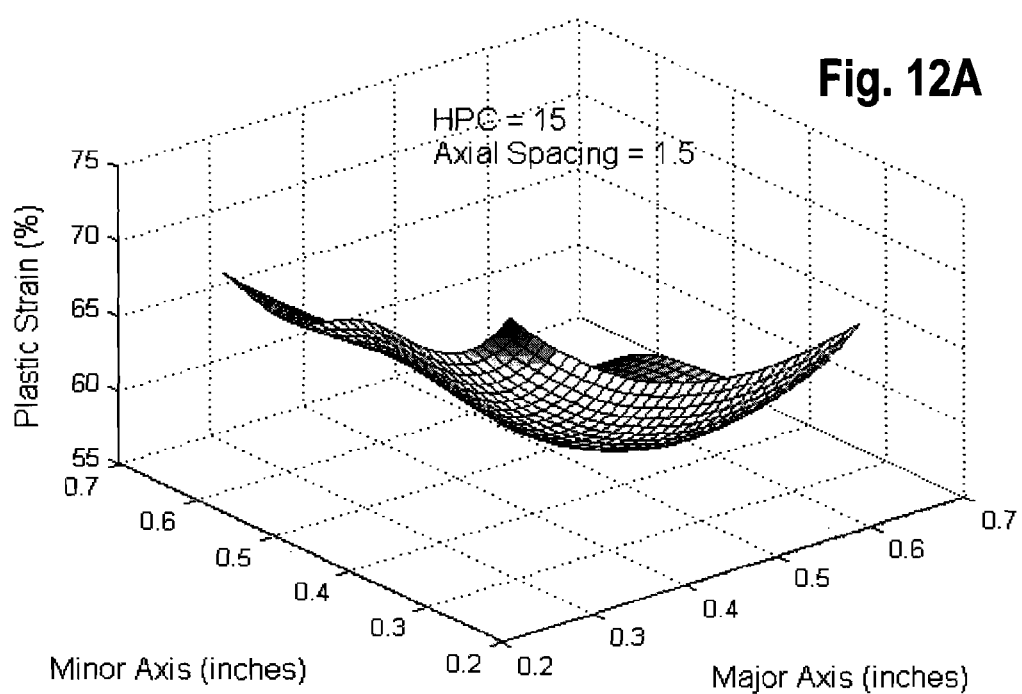
FIGS. 12A-12B show an illustrative global ensemble's plastic strain and tensile load predictions as a function the hole dimensions.
Figure 12B:
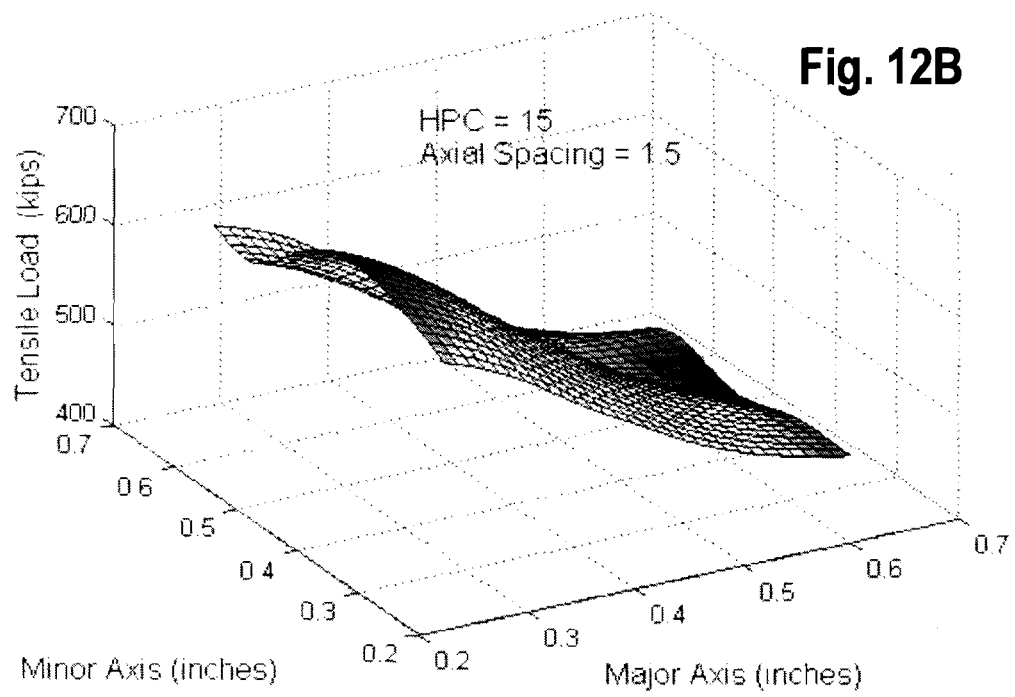

In this simplified experiment, it is not difficult to select the best global ensemble (GNNE3). FIGS. 11A-11C display the predictions of this global ensemble for circular holes of diameter 0.5, 0.45, and 0.325 inches, respectively. In each case, the predicted tensile load as a function of axial spacing and holes per row exhibits a reasonable extrapolation. FIGS. 12A-12B display the selected global ensemble's plastic strain and tensile load predictions as a function of hole dimensions for fixed values of s and HPC. We can see that again, the simulated output has a reasonable transfer over the major and minor axes of the hole. However, in other cases each global ensemble candidate could have high NA on different parts of data set. The winner could also have medium or lower NA depending on the problem.

Three additional experiments were conducted in this study to empirically investigate the effects of changing: the objective function, the resampling, the data partitioning, and the size of candidate network pool. The partial results are summarized in Table 3.

TABLE 3

EMPIRICAL COMPARISON OF NA IN VOIDS AND ENSEMBLE VALIDATION ERROR

| IndNum | Exp1Na (h0325) | Exp2Na (h0325) | Exp3Na (h0325) | Exp1Err (%) | Exp2Err (%) | Exp3Err (%) |
|---|---|---|---|---|---|---|
| GNNE1 | 0.951 | 1.819 | 1.087 | 6.31 | 6.05 | 4.88 |
| GNNE2 | 1.061 | 1.934 | 0.761 | 6.38 | 6.11 | 4.86 |

TABLE 3-continued

EMPIRICAL COMPARISON OF NA IN VOIDS AND ENSEMBLE VALIDATION ERROR

| IndNum | Exp1Na (h0325) | Exp2Na (h0325) | Exp3Na (h0325) | Exp1Err (%) | Exp2Err (%) | Exp3Err (%) |
|---|---|---|---|---|---|---|
| GNNE3 | 1.050 | 1.778 | 1.000 | 6.30 | 6.00 | 4.86 |
| GNNE4 | 1.026 | 1.572 | 1.088 | 6.43 | 5.86 | 5.06 |
| GNNE5 | 1.050 | 2.154 | 1.036 | 6.43 | 6.05 | 5.04 |

The first experiment listed in Table 3 was almost the same as that previously described, except that a minus sign was used in the FCAES objective function before the NA term to encourage member network diversity. (The second and third experiments also used a minus sign.) In the second experiment, the partitioning of the primary and secondary data sets was the same, but no resampling was used (meaning that the training set for all 32 neural networks in the candidate pool was the same). In the third experiment, the primary data set included all 62 data samples and the secondary data set included 3 data samples from later FEA simulations. Resampling was applied 16 times with 6 samples excluded from the primary data set to form each training set, and 128 candidate networks with eight variations in structure were created. In each experiment, five local ensembles were selected and combined to form five global ensembles using the proposed method and procedures. The NA for each experiment in Table 3 was calculated on the same void of subspace, i.e., the subspace with hole diameter equal to 0.325 inches, and the ensemble validation error was tested on the same 62 samples. The same five weight coefficient settings for the objective function were used in each experiment.

We can see from the validation error in Table 3 that training candidate NNs without resampling (Exp. 2) can yield similar ensemble prediction accuracy on the given data set 502. However, the NA values indicate that the member networks' predictions on the distant voids have greater deviations compared to the training with resampling, which might be advantageous.

As might be expected, increasing the number of network structure variations, increasing the number of data points, and increasing the number of training data sets, in combination with using a larger neural network candidate pool (Exp. 3) can improve the ensemble prediction over the training samples, and probably over the extended neighborhood as well. However, since the measured NA on the voids was close in amplitude between Exp. 1 and Exp. 3, the ensemble predictions on the distant voids may have same degree of uncertainty.

Figure 13A:
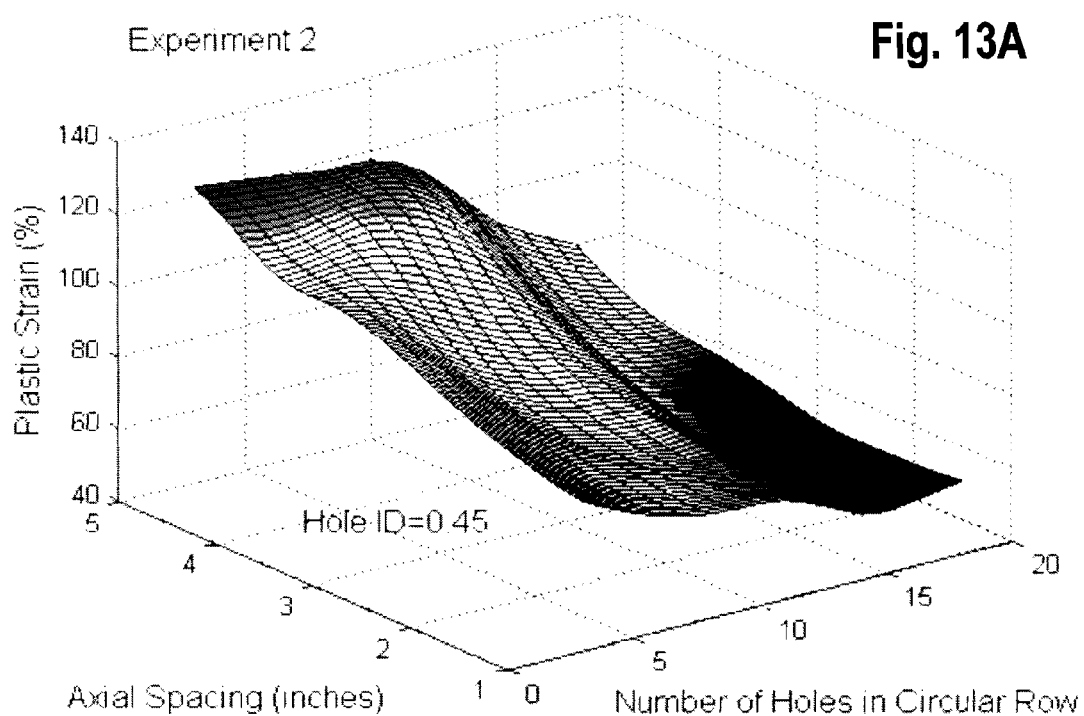
FIGS. 13A-13B show plastic strain predictions as a function of axial spacing and holes per circular row for two different global ensembles.
Figure 13B:
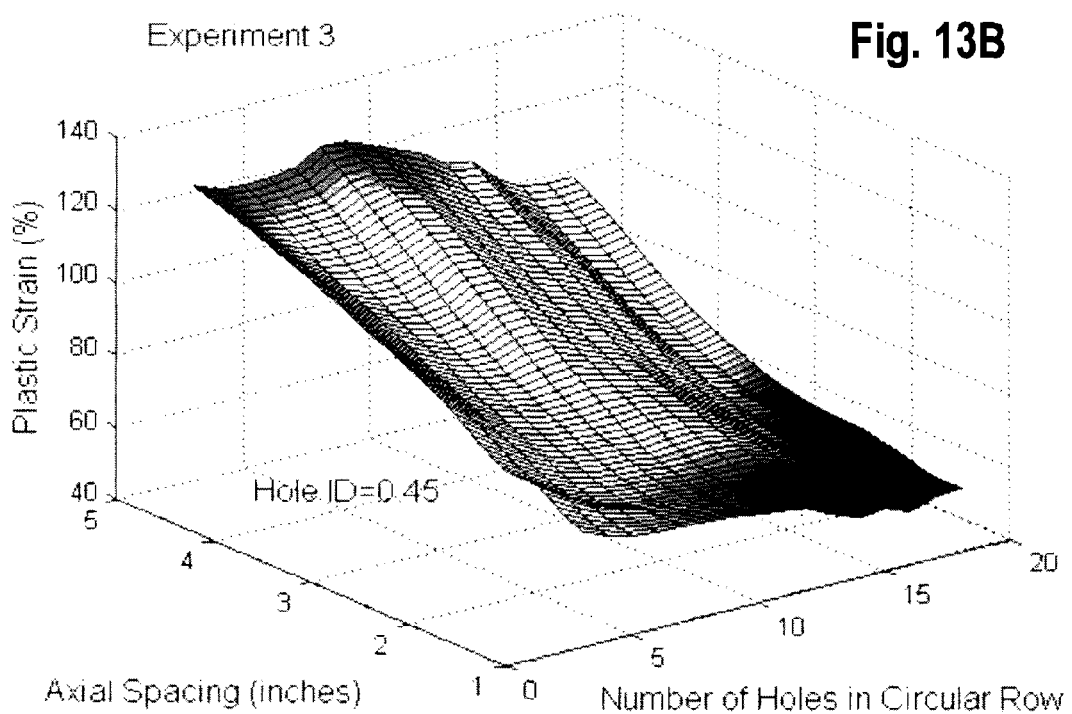

FIGS. 13A-13B show a simulated subsurface in Exp. 2 and Exp. 3 respectively. The subsurface indicates the plastic strain predictions of the selected global ensembles as a function of axial spacing and holes per row, assuming constant hole diameter of 0.45 inches. The predicted plastic strain surfaces look similar even when resampling is omitted as in Exp. 2. This comparison suggests that while it is beneficial to train diverse candidate networks to improve sparse data modeling, we may not need to overcomplicate the process by forming a large number of resampled training data sets to create a large candidate pool.

Changing weighting factors of FCAES objective function has strong effect on the member network distribution. Although the same network is allowed to show its presence more than once in the ensemble, more diverse networks will be selected by choosing negative $k_3$. However, as shown in Table 2 (using positive $k_3$) and Table 3 (using negative $k_3$), the ensemble performance is not sensitive to the particular setting of weighting coefficients once multiple settings and larger global ensemble size are used.

Figure 14:
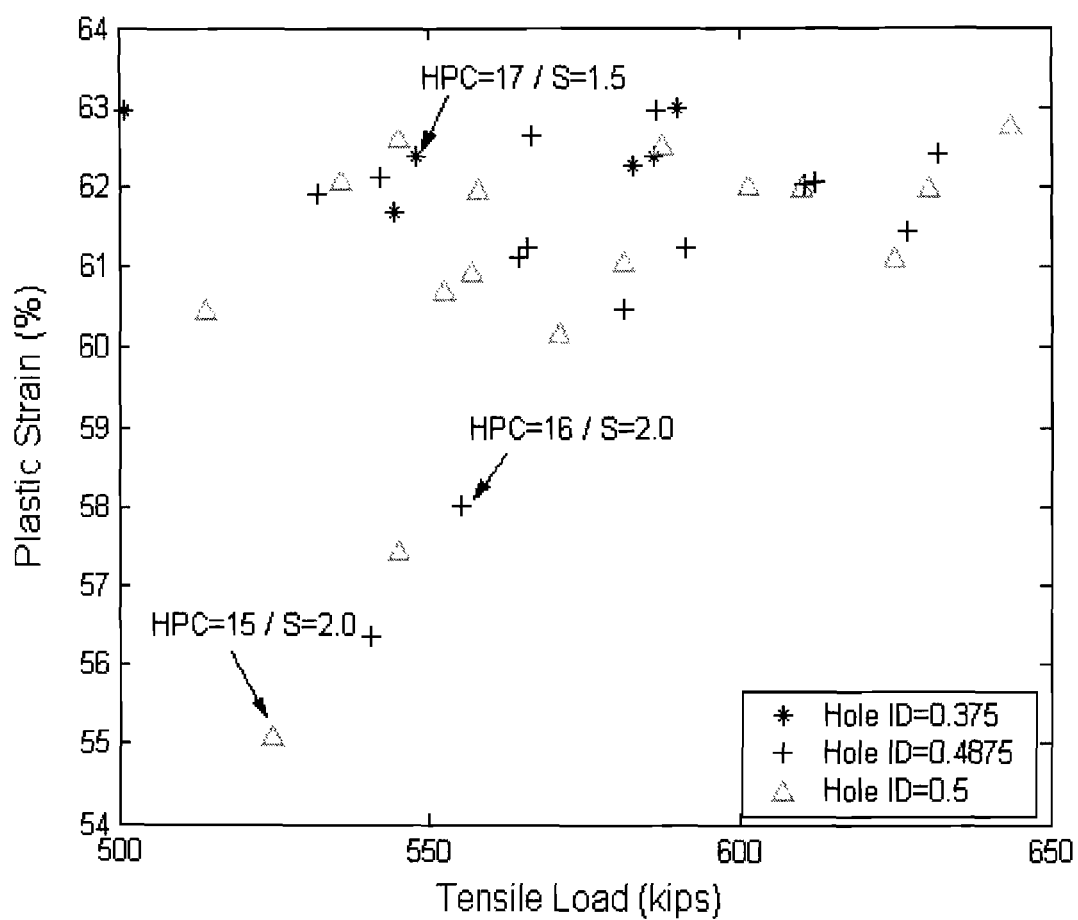
FIG. 14 shows an illustrative global ensemble's predictions of plastic strain vs tensile load for selected parameter values.

The global ensemble that is selected in block 428 of FIG. 4 can then be used as a surrogate model in block 430 to conduct a search of the parameter space for an optimal solution. The solutions can be evaluated for optimality in block 432 until a likely candidate or range of parameter values is identified. In the present case study, the base pipe design for an expandable screen should demonstrate (after expansion) a plastic strain below an upper limit and a tensile load above a lower limit (e.g., 63% and 550 kilo-pounds force). Given the four-input design space, we conducted an exhaustive search over a practical range of each input and calculated the strain and load outputs using the developed surrogate model ensembles. Combined with other simulation results, we found many promising solutions under manufacturing constraints. FIG. 14 depicts selected simulation results in parameter space. Although probably not perfect due to data limitations, the global ensemble performed reasonably well in generating robust predictions over a wide range of parameter space.

Having identified selected parameter ranges the computer uses the high-fidelity model in block 406 to refine the estimated performance of the tool and verify the optimality of the selected solution. In this manner, the computational requirements involved in selecting an optimal tool design can be greatly reduced.

The expandable pipe case study presented herein was used to construct a surrogate model in the form of a neural network ensemble trained over a sparse data set obtained from finite element analysis simulations. In addition to tool design optimization, the disclosed methods also have applications in material characterization, tool testing, data pattern recognition, and many other fields of endeavor. For example, adaptive control systems typically require feedback with minimal delay, implying a limit on the complexity of models employed in the feedback path. Surrogate models are hence very desirable in situations where the controlled system is unduly complex, and the data set available for developing such models may be sparse where such systems are subject to significant revisions or evolution in behavior.

As another example, many medical treatment strategies for disease may employ multiple components, and only a limited amount of information may be available regarding the effectiveness of each component alone or in combination with the other components. In such situations, a surrogate model may be a feasible alternative to massive trial programs that cannot fully explore the limits of the data space due to the risks involved to human lives.

Yet another example is the determination of properties of new materials under difficult-to-simulate conditions such as ultra-high strain rates. The variables underlying such properties may include material constituents, erosion, wear, and fatigue.

Numerous variations and modifications will become apparent to those skilled in the art once the above disclosure is fully appreciated. For example, genetic algorithms provide a useful selection technique, but may be replaced by other suitable selection techniques including steepest descent algorithms, random selection, and exhaustive searches. Moreover, the selected neural network ensembles may be augmented with models and/or approximations derived from first principles. It is intended that the following claims be interpreted to embrace all such variations and modifications.

What is claimed is:

1. A modeling system that comprises:
a memory; and
a processor coupled to the memory and configured to execute software stored in said memory, wherein said software configures the processor to:
create a pool of neural networks trained on a portion of a data set;
for each of various coefficient settings for a multi-objective function:
apply selective evolution subject to the multi-objective function with that coefficient setting to obtain a corresponding group of neural network ensembles; and
select a local ensemble from each said group of neural network ensembles, wherein the selection is based on data not included in said portion of the data set;
combine a plurality of the local ensembles to form a global ensemble of local ensembles; and
provide a perceptible output based at least in part on a prediction by the global ensemble.

2. The system of claim 1, wherein as part of creating the pool of neural networks, the software configures the processor to:
form multiple training data sets from said portion of the data set; and
train neural networks having different architectures with the multiple training data sets.

3. The system of claim 1, wherein the multi-objective function is based at least in part on a measure of the ensemble's mean square error (EMSE) over said portion of the data set.

4. The system of claim 3, wherein the multi-objective function is further based at least in part on a measure of network ambiguity averaged over said portion of the data set.

5. The system of claim 1, wherein as part of forming a global ensemble, the software configures the processor to evaluate global ensemble candidates based at least in part on a measure of prediction error over the entire data set.

6. The system of claim 1, wherein as part of forming a global ensemble, the software configures the processor to evaluate global ensemble candidates based at least in part on a measure of network ambiguity over a data subspace including values not in the data set.

7. The system of claim 1, wherein as part of forming a global ensemble, the software configures the processor to evaluate global ensemble candidates based at least in part on a measure of smoothness or consistency over a data subspace.

8. The system of claim 1, wherein as part of forming a global ensemble, the software configures the processor to graphically render prediction subspaces of global ensemble candidates for evaluation of those candidates.

9. The system of claim 1, wherein as part of providing a perceptible output, the software configures the processor to use the global ensemble to identify at least one potential solution for submission to a subsequent modeling process.

10. The system of claim 1, wherein as part of providing a perceptible output, the software configures the processor to use the global ensemble to find within a parameter space a solution that is at least locally optimum.

11. The system of claim 1, wherein the perceptible output is at least one specification value for a product.

12. The system of claim 1, wherein the perceptible output is a control signal for a regulated process.

13. A computer-based modeling process that comprises:
    obtaining a data set having output values associated with input values;
    partitioning the data set into primary and secondary subsets;
    training a pool of neural networks without using data from the secondary subset;
    developing a group of neural network ensembles using different objective functions;
    selecting local ensembles from the group using data from the secondary subset;
    forming a global ensemble having multiple local ensembles; and
    providing a perceptible output based at least in part on a prediction by the global ensemble.

14. The process of claim 13, wherein said combining multiple local ensembles includes evaluating global ensemble candidates based at least in part on a measure of network ambiguity over a data subspace including values not in the data set.

15. The process of claim 13, wherein said combining multiple local ensembles includes evaluating global ensemble candidates based at least in part on a measure of prediction smoothness over a parameter space.

16. The process of claim 13, wherein said providing a perceptible output includes using the global ensemble to find within a parameter space a solution that is at least locally optimum.

17. A method that comprises:
    determining a system's response to a limited set of input parameter values;
    deriving a system model that predicts the system's response over a larger set of input parameter values, wherein the system model includes a neural network ensemble comprising multiple local neural network ensembles, each local neural network ensemble selected from a corresponding set of neural network ensembles developed based on a particular weighting for a multi-objective function, wherein said multi-objective function is evaluated based on a first portion of the limited set of input parameter values, and wherein said selection is made based on input parameter values held out from said first portion; and
    storing or displaying a system response predicted by the system model.

18. The method of claim 17, wherein said neural network ensemble is selected from a group of global ensemble candidates that are evaluated based at least in part on a measure of network ambiguity over a data subspace.

19. The method of claim 17, wherein said neural network ensemble is selected from a group of global ensemble candidates that are evaluated based at least in part on a measure of smoothness over a data subspace.

20. The method of claim 17, further comprising producing a product having a characteristic based at least in part on the predicted system response.

* * * * *